United States Patent
Munukutla et al.

(10) Patent No.: US 10,692,530 B2
(45) Date of Patent: Jun. 23, 2020

(54) ELECTRONIC DEVICE AND METHOD OF MANAGING A PLAYBACK RATE OF A PLURALITY OF IMAGES

(71) Applicant: SAMSUNG ELECTRONICS CO., LTD., Suwon-si (KR)

(72) Inventors: Sowmya Purna Munukutla, Hyderabad (IN); Roopa Kotiganahally Sheshadri, Bangalore (IN); Hema Sundara Srinivasula Reddy Gogi Reddy, Andhra Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 15/400,558

(22) Filed: Jan. 6, 2017

(65) Prior Publication Data
US 2017/0200472 A1 Jul. 13, 2017

(30) Foreign Application Priority Data

Jan. 7, 2016 (IN) .............................. 201641000637

(51) Int. Cl.
*G11B 27/00* (2006.01)
*H04N 21/432* (2011.01)
(Continued)

(52) U.S. Cl.
CPC ........ *G11B 27/005* (2013.01); *G06K 9/00744* (2013.01); *G06K 9/3233* (2013.01);
(Continued)

(58) Field of Classification Search
CPC ....... G11B 27/005; G11B 27/28; G11B 27/34; G06K 9/3233; G06K 9/4604; H04N 5/4403; H04N 2005/4432
See application file for complete search history.

(56) References Cited

U.S. PATENT DOCUMENTS 6,760,536 B1 7/2004 Amir et al.
8,319,859 B2 11/2012 Kim et al.
(Continued)

FOREIGN PATENT DOCUMENTS

JP 2006-238022 A 9/2006
JP 2010-272999 A 12/2010
(Continued)

OTHER PUBLICATIONS

International Search Report, issued by International Searching Authority in corresponding International Application No. PCT/KR2017/000256, dated Mar. 22, 2017, (PCT/ISA/210).
(Continued)

*Primary Examiner* — Ngoc Yen T Vu
(74) *Attorney, Agent, or Firm* — Sughrue Mion, PLLC

(57) ABSTRACT

Disclosed herein are an electronic device and a method of managing a playback rate of a plurality of images using an electronic device. The electronic device may include a display, an image capturing unit configured to obtain a plurality of images, a motion detecting unit configured to detect motion data of at least one region of interest (ROI) in the plurality of images, and a controller configured to determine at least one playback rate for the plurality of images based on the detected motion data and control the display to display the plurality of images based on the at least one playback rate.

20 Claims, 32 Drawing Sheets

(51) Int. Cl.
*G06K 9/00* (2006.01)
*G06K 9/32* (2006.01)
*G11B 27/28* (2006.01)
*G11B 27/34* (2006.01)
*H04N 5/44* (2011.01)
*G06K 9/46* (2006.01)

(52) U.S. Cl.
CPC .............. *G11B 27/28* (2013.01); *G11B 27/34* (2013.01); *H04N 5/4403* (2013.01); *H04N 21/4325* (2013.01); *G06K 9/4604* (2013.01); *H04N 2005/4432* (2013.01)

(56) References Cited

U.S. PATENT DOCUMENTS

| | | | |
|---|---|---|---|
| 8,472,791 B2 | 6/2013 | Gargi | |
| 9,723,201 B2* | 8/2017 | Fujita | G06T 11/001 |
| 9,997,197 B2* | 6/2018 | Tang | G11B 27/005 |
| 10,075,744 B2* | 9/2018 | Hurst | H04N 21/47217 |
| 10,419,677 B2* | 9/2019 | Kosaka | H04N 5/23216 |
| 2002/0039481 A1 | 4/2002 | Jun et al. | |
| 2008/0129854 A1 | 6/2008 | Onoda et al. | |
| 2010/0039536 A1 | 2/2010 | Dahllof et al. | |
| 2010/0053345 A1 | 3/2010 | Kim et al. | |
| 2010/0295970 A1 | 11/2010 | Suzuki | |
| 2011/0064384 A1 | 3/2011 | Otani | |
| 2011/0310261 A1 | 12/2011 | Crisan et al. | |
| 2013/0058633 A1* | 3/2013 | Hoshino | H04N 5/783 386/344 |
| 2013/0120240 A1 | 5/2013 | Hong | |
| 2014/0354850 A1 | 12/2014 | Kosaka et al. | |
| 2015/0169964 A1 | 6/2015 | Finn et al. | |
| 2015/0221335 A1* | 8/2015 | Licata | G11B 27/005 386/279 |
| 2015/0358521 A1 | 12/2015 | Nonaka | |
| 2016/0313903 A1* | 10/2016 | Rabinovitz | G06F 3/0485 |

FOREIGN PATENT DOCUMENTS

| | | |
|---|---|---|
| JP | 5058780 B2 | 10/2012 |
| KR | 10-2010-0028399 A | 3/2010 |
| KR | 10-2014-0069570 A | 6/2014 |

OTHER PUBLICATIONS

Written Opinion, issued by International Searching Authority in corresponding International Application No. PCT/KR2017/000256, dated Mar. 22, 2017, (PCT/ISA/237).
Communication dated Sep. 18, 2018, issued by the European Patent Office in counterpart European Application No. 17736168.0.
Communication dated Jul. 11, 2019 by the European Patent Office in counterpart European Patent Application No. 17736168.0.

* cited by examiner

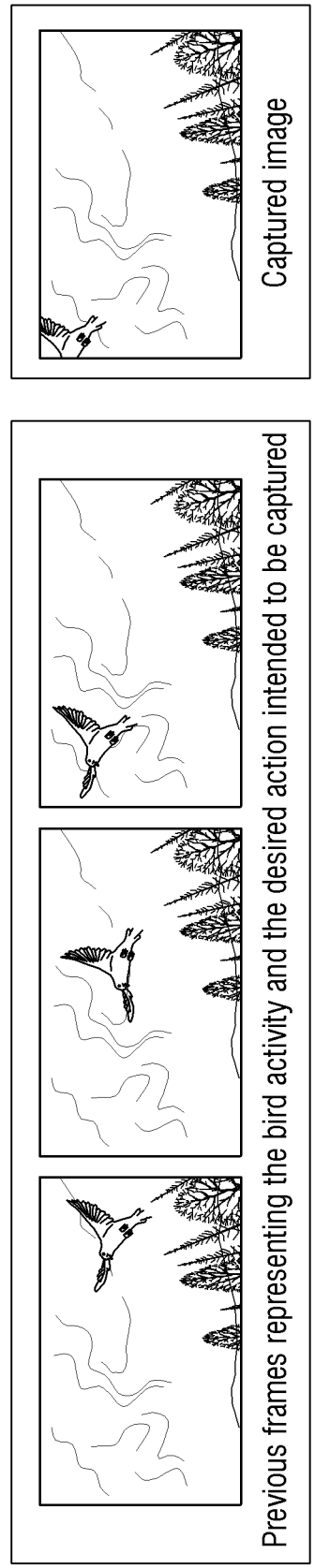

Stationary camera - Stationary object playback

←— Fast playback rate —→ ←— Fast playback rate —→ ←— Fast —→
(0-60 frames) (60-90 frames) playback rate
(90-120 frames)

Video Ken Burns and Contrast enhancement of key moment image

Tilt Left motion
Slow Playback

Tilt Right motion
Fast Playback

Multiple viewing angles with bounding boxes around motion points

FIG. 19C

| Motion Playback ||
|---|---|
| Content will be played in slow motion ||
| Disable motion playback● | Proceed |

ELECTRONIC DEVICE AND METHOD OF MANAGING A PLAYBACK RATE OF A PLURALITY OF IMAGES

CROSS-REFERENCE TO RELATED APPLICATIONS

This application is based on and claims priority from Indian Provisional Application No. 201641000637, filed on Jan. 7, 2016 in the Intellectual Property India, and Indian Patent Application No. 201641000637, filed on Sep. 28, 2016 in the Intellectual Property India, the disclosures of which are incorporated by reference herein in their entireties.

BACKGROUND

1. Field

Devices and methods of the disclosure relate generally to an electronic device and a method of managing a playback rate of a plurality of images using an electronic device, and more particularly, to an electronic device capable of determining at least one playback rate for each of images based on image analysis result.

2. Description of Related Art

Generally, while capturing an image, a user adjusts for the best angle, adds suitable filters, clicks the shutter at an intended moment, views the image, and often re-takes the shot in an effort to recapture that precise moment. More often, the user ends up missing the desired action or emotion that he was trying to capture, and it may require more than a few takes to capture the essence of that moment. Thus, the process of capturing the precise moment at that very instance can become cumbersome and may even ruin the user experience.

The conventional method demonstrates a variable-rate playback-based browsing technique of digital videos, but fails to provide a mechanism for modeling playback around a particular frame within the digital video. Moreover, these techniques involve examining long videos. Conventional methods also fail to address user experience encompassing viewing of motion information captured along with a high resolution image, and furthermore, fail to provide a unique visual representation of a motion activity modeled around a particular frame pertaining to the digital moving image.

SUMMARY

According to an aspect of an exemplary embodiment, an electronic device for controlling a playback rate of a plurality of images is provided. The electronic device may include: a display; an image capturing unit configured to obtain a plurality of images; a motion detecting unit configured to detect motion data of at least one region of interest (ROI) in the plurality of images; and a controller configured to determine at least one playback rate for the plurality of images based on the detected motion data, and control the display to display the plurality of images based on the at least one playback rate.

According to an aspect of an exemplary embodiment, a method for controlling a playback rate of a plurality of images using an electronic device may include: obtaining a plurality of images, detecting motion data of at least one region of interest (ROI) in the plurality of images, determining at least one playback rate for the plurality of images based on the detected motion data, and displaying the plurality of images based on the at least one playback rate.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein:

FIG. 1A illustrates previous frames representing a flying motion of a bird and an image captured unintentionally by a user, according to a related art;

FIGS. 19A-19C illustrate an example scenario in which a user of an electronic device is alerted when at least one playback rate is varied, according to an exemplary embodiment.

DETAILED DESCRIPTION

Figure 1B:
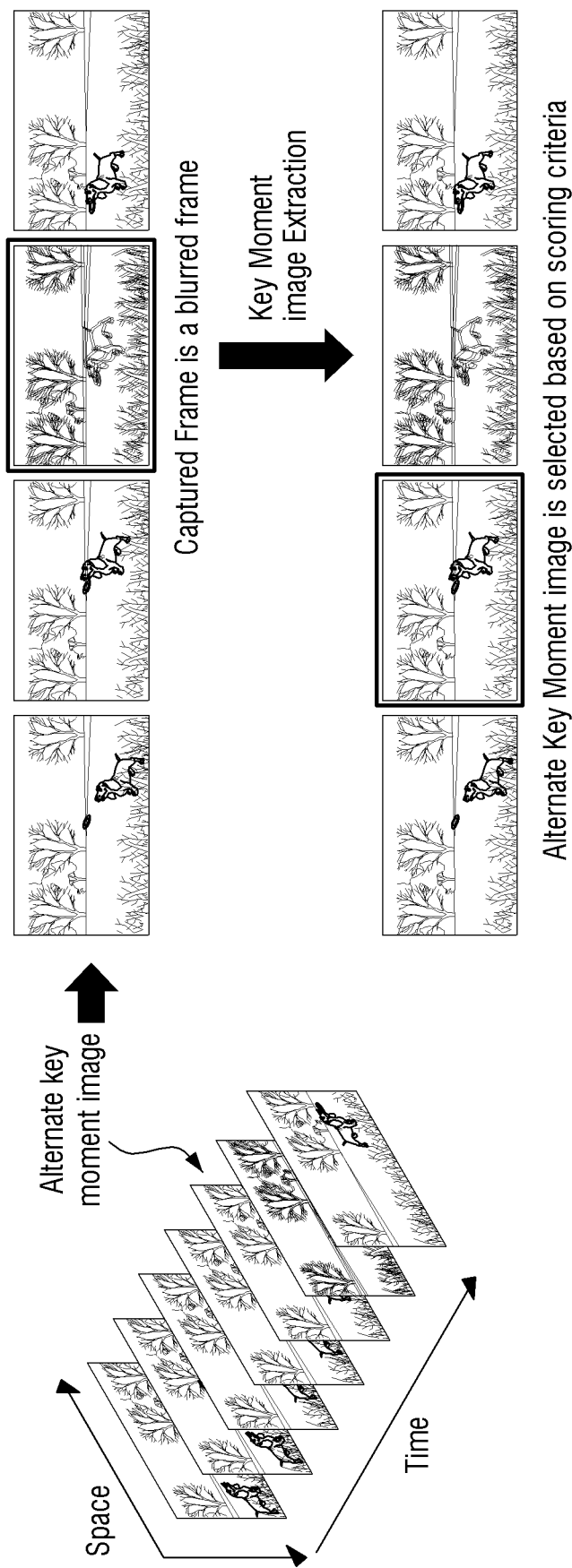
FIG. 1B illustrates a method of capturing a series of images before and after an image is captured by storing a plurality of frames as a background activity, according to an exemplary embodiment.

Hereinafter, various example embodiments of the present disclosure will be described in greater detail with reference to the accompanying drawings. In explaining the present disclosure, when it is deemed that specific explanation on a related well known technology may unnecessarily obscure the main point of the present disclosure, detailed explanation of the related well known technology may be omitted. The terms hereinafter are terms defined in consideration of the functions in the present disclosure, and may thus vary depending on the user, operation and practice, etc. Therefore, definitions should be made based on the overall contents of the description.

Terms including numerical expressions such as a first, a second and the like may be used to explain various elements, but there is no limitation thereto. These terms are used simply for the purpose of differentiating one element from another. For example, a first element may be called a second element, and similarly, a second element may be called a first element instead. The term 'and/or' includes a combination of a plurality of related items or one of the plurality of related items.

The terms used in this description are intended for explaining the example embodiments of the present disclosure, and not for restricting and/or limiting the present disclosure. A singular expression includes a plural expression unless clearly mentioned otherwise. In this description, terms such as 'include' and 'have/has' should be construed as designating that there are such characteristics, numbers, operations, elements, components or a combination thereof in the description, not to exclude the existence or possibility of adding one or more of other characteristics, numbers, operations, elements, components or a combination thereof.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms "viewport," "view finder," "viewing window," "viewing rectangle," and "view angle" are used interchangeably throughout the description.

Accordingly the embodiments herein provide a method and electronic device for managing a playback rate of a plurality of images. The method includes obtaining a plurality of images. Further, the method includes detecting motion data of at least one region of interest (ROI) in the images. Further, the method includes determining at least one playback rate for the images based on the motion data. Further, the method includes playing back the plurality of images based on the at least one playback rate.

Unlike conventional systems and methods, the proposed method provides a visual representation of motion activity associated with an image and determines the transition speed (i.e., time intervals between frames) in the digital moving image by modeling it around the key moment frame (captured image). The proposed method can be used to identify multiple segments with high motion activity based on motion data, leveraging camera cues and optical flow estimates. Further, the proposed method can be used to identify the segments with random and unintended motion by utilizing the motion data. The identified segments can be discarded without compromising the user experience. The captured frame and the motion points associated with the temporal data across all the frames is enhanced and a moving image composition is generated to provide a distinctive viewing experience to the user.

Referring now to the drawings, and more particularly to FIGS. 1B through 20, where similar reference characters denote corresponding features consistently throughout the figures, these are shown preferred embodiments.

FIG. 1A illustrates previous frames representing a flying motion of a bird and an image captured unintentionally by a user, according to a related art. Consider a scenario where the user needs to capture a moment (e.g., image or event) with unpredictable timing and a short window of time. More often, the user ends up missing the desired action or emotion and might require more than few takes to capture the essence of that moment. The moment can lapse during a time taken to compose a frame and click on a shutter icon of an image capturing unit. A plurality of frames (i.e., a plurality of images) representing a bird taking flight and the desired action intended to be captured by the user are shown in FIG. 1A. Thus, the moment captured through the image capturing unit may be undesirable for the user. Therefore, the process of capturing the intended moment at that very instant may be very difficult.

FIG. 1B illustrates a method of capturing a series of images before and after an image is captured by storing a plurality of frames as a background activity, according to an exemplary embodiment. As shown in FIG. 1B, initially, the plurality of images (i.e., frames) are captured in the background prior to and after pressing a camera shutter (i.e., shutter icon) to capture an image. Further, the captured image is analyzed to identify an out-of-focus blur, motion blur distortion, and/or blurring from extreme light intensity. If the captured image is a blurred image, then an alternate key moment image is selected based on scoring criteria as shown in FIG. 1B.

Further, an alternate key moment image with a score above a certain threshold and closest in time to the captured image is selected as a new key moment image for subsequent analysis and playback. According to exemplary embodiments, an enhanced live photo may be generated with camera images around a still shot using image analysis techniques. Further, moments before and after the image may be captured by saving multiple camera images (i.e., camera frames) as a background activity.

According to exemplary embodiments, stationary images may be visually represented by incorporating motion information assigned to each discrete frame. Each of the images is classified into segments of variable sizes with different playback rates after discarding irrelevant segments.

Figure 2:
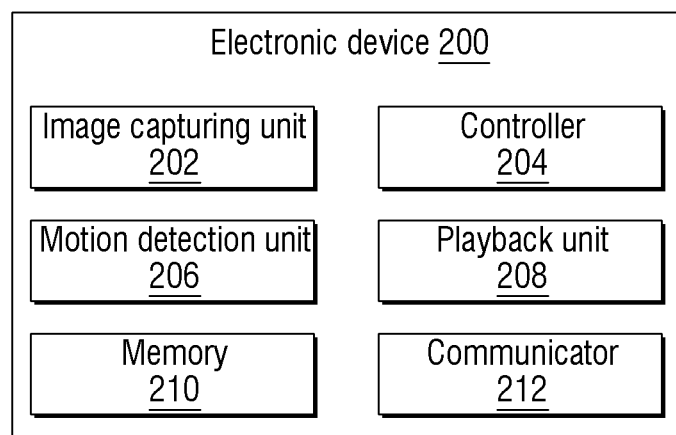
FIG. 2 is a block diagram of an electronic device for managing a playback rate of a plurality of images, according to an exemplary embodiment.

FIG. 2 is a block diagram of an electronic device 200 for managing the playback rate of the plurality of images, according to an exemplary embodiment. The electronic device 200 can be, for example, an image capturing device, a camera, a laptop computer, a desktop computer, a mobile phone, a smartphone, a personal digital assistant (PDA), a tablet, a phablet, a consumer electronic device, a dual-display device, a head-mounted display, a virtual reality (VR) device, a wearable device, or any other electronic device. The electronic device 200 includes an image capturing unit (e.g., a camera) 202, a controller (e.g., a processor) 204, a motion detection unit (e.g., a motion sensor) 206, a playback unit (e.g., a display) 208, a memory (e.g., a storage) 210, and a communicator 212.

Initially, the image capturing unit 202 stores the plurality of images (i.e., frames) in the background prior to and after clicking the camera shutter icon to capture a high resolution image. The controller 204 can be configured to obtain the plurality of images from the image capturing unit 202. In an example, the plurality of images may include a first set of images before capturing a reference image and a second set of images after capturing the reference image. In another example, the plurality of images corresponds to a 360° video, a plurality of viewing angles in which each of the views includes at least one image, or a plurality of segments of a video in which each of the segments includes at least one image. Further, the functionalities of the controller 204 are explained in conjunction with FIG. 3.

Further, the motion detection unit 206 can be configured to detect motion data of at least one ROI in the images. According to an aspect of an exemplary embodiment, the motion data is determined based on camera cues, image analysis, a viewing window, a motion of the electronic device 200, and/or visual activity in the at least one image of the plurality of images. The playback unit 208 can be configured to identify at least one key moment image (i.e., key moment frame) from the plurality of images based on the motion data of the at least one ROI and quality of the at least one ROI. Further, the playback unit 208 can be configured to assign a score to each of the images based on the motion data and the temporal distance from the key moment image.

In an example, the score for discrete segments is generated by analyzing various attributes such as motion sensors available in the electronic device 200 (i.e., pan, zoom-in, zoom-out, tilt, random camera movements), motion activity-based weighting for visual analysis, proximity of the segment to the captured image, and other predetermined weight attributes such as face detection, determining zoom ratio using camera cues, determining auto-focus information using the camera cues, determining blur, brightness, and contrast values, and frame quality or motion based qualification metrics. The weights multiplied by sub-scores computed for all the segments are summed to generate a final score for the individual segment.

Further, the playback unit 208 can be configured to select the at least one playback rate for the images based on the score associated with each of the images. According to an aspect of an exemplary embodiment, each of the images from the plurality of images may be automatically played at varying playback rate based on the motion data. According to an aspect of an exemplary embodiment, a user of the electronic device 200 may be alerted when the at least one playback rate is varied. The at least one playback rate at runtime may be varied based on the user feedback. According to an aspect of an exemplary embodiment, a panning speed and/or a zoom ratio may be varied when each of the images from the plurality of images is automatically played back. A segment of images from the plurality of images may be automatically played at varying playback rate based on the motion data.

According to an aspect of an exemplary embodiment, the playback unit 208 can be configured to detect at least one of a plurality of non-planar regions, and a plurality of salient features, displayed in a viewing window. Further, the playback unit 208 can be configured to identify at least one key moment image from the plurality of images based on the at least one of the feature detection, the plurality of non-planar regions, and the plurality of salient features. Further, the playback unit 208 can be configured to select the at least one playback rate for each of the images based on the at least one key moment image and the motion data.

According to an aspect of an exemplary embodiment, the playback unit 208 can be configured to display a bounding box for the at least one ROI in the images based on the motion data. Further, the playback unit 208 can be configured to track and determine whether an area of the bounding box for the at least one ROI in the at least one image from the plurality of images meets bounding box criteria. Further, the playback unit 208 can be configured to select the at least one playback rate for the at least one image from the plurality of images based on the bounding box criteria. According to an aspect of an exemplary embodiment, the playback unit 208 can be configured to determine the viewing window of the electronic device 200. Further, the playback unit 208 can be configured to select the at least one playback rate for the at least one image from the plurality of images based on the viewing angle.

According to an aspect of an exemplary embodiment, the at least one image, from the plurality of images, is automatically discarded based on the at least one parameter. In the plurality of images, the high resolution image is automatically replaced with a low resolution image based on at least one parameter. The parameter includes motion parameters, the camera cues, visual activity, and quality. The camera cues are utilized for face detection, zoom ratio determination, and auto focus determination.

The memory 210 may include one or more computer-readable storage media. The memory 210 may include non-volatile storage elements. Examples of such non-volatile storage elements may include magnetic hard disks, optical discs, floppy disks, flash memories, electrically programmable read-only memories (EPROM) or electrically erasable and programmable read-only memories (EEPROM). In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory unit 210 is non-movable. In some examples, the memory 210 can be configured to store larger amounts of information than the memory. In certain examples, a non-transitory storage medium may store data that can, over time, change (e.g., in random access memory (RAM) or cache). The communicator 212 communicates internally with the units and externally with networks.

According to an aspect of an exemplary embodiment, automatic playback of a digital moving image (i.e., video) may be performed by controlling the playback rate of the image. The digital moving image may be automatically played back by controlling the playback rate of the frames captured along with the high resolution image to animate a stationary captured image.

The electronic device 200 may include other components and elements not shown in FIG. 2. Further, the electronic device 200 can include different units communicating among each other along with other hardware or software components. By way of illustration, both an application running on the electronic device 200 and the electronic device 200 can be the component.

Figure 3:
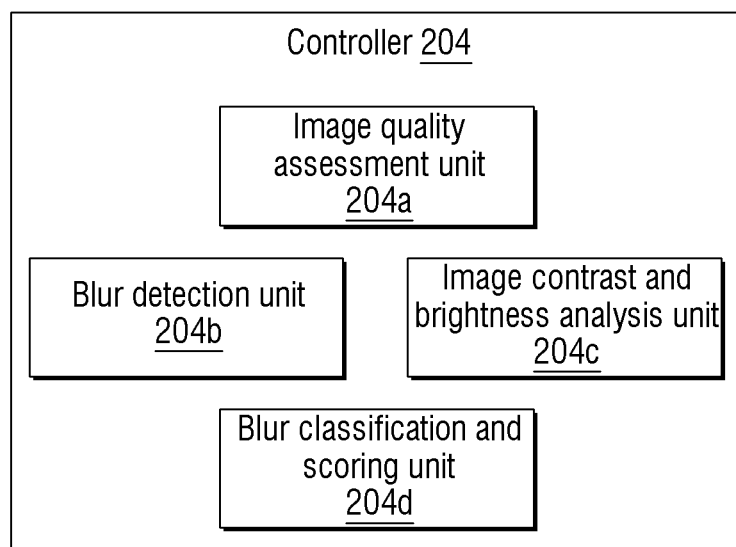
FIG. 3 is a block diagram of a controller, according to an exemplary embodiment.

FIG. 3 is a block diagram of the controller 204, according to an exemplary embodiment. The controller 204 may include an image quality assessment unit 204a, a blur detection unit 204b, an image contrast and brightness analysis unit 204c, and a blur classification and scoring unit 204d.

The image quality assessment unit 204a may receive a high resolution image from the image capturing unit 202. After receiving the high resolution image, the image quality assessment unit 204a may assess the quality of the captured image. Further, the image quality assessment unit 204a may send the assessed image to the blur detection unit 204b and the image contrast and brightness analysis unit 204c. The blur detection unit 204b may generate a score based on the blur intensity and the contrast. The image contrast and brightness analysis unit 204c may enhance the contrast and normalize the image. If it is determined that the score of the image is high (i.e., higher than a threshold value) then, the alternate key moment image closest to the captured high resolution image may be selected by analyzing the scores. In an example, the scores obtained are considered to determine the alternate key moment image. The image with the score beyond a certain threshold value closest to the captured image is selected as a new key moment image for subsequent analysis and playback. As used herein, the term "closest" signifies temporal proximity.

The controller 204 is not limited to what is shown in FIG. 3 and may include other components or elements. Further, the controller 204 can include different units communicating among each other along with other hardware or software components. By way of illustration, both an application running on the controller 204 and the controller 204 can be the component.

Figure 4A:
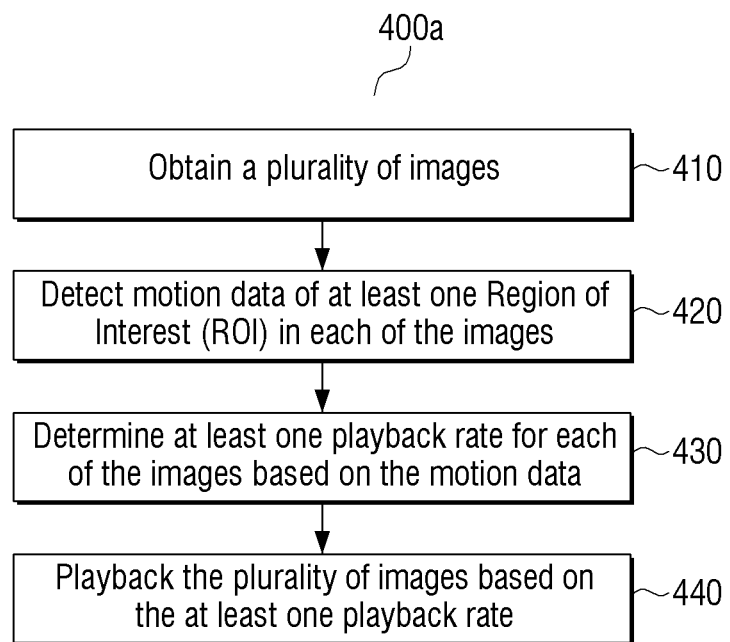
FIG. 4A is a flowchart for managing a playback rate of a plurality of images, according to an exemplary embodiment.

FIG. 4A is a flowchart 400a for managing the playback rate of the plurality of images, according to an exemplary embodiment. At step 410, the controller 204 may obtain the plurality of images. In an example, the plurality of images includes the first set of images before capturing the reference image and the second set of images after capturing the reference image. In another example, the plurality of images corresponds to a 360° video, the plurality of viewing angles in which each of the view includes at least one image, or the plurality of segments of the video in which each of the segment includes the at least one image.

At step 420, the motion detection unit 206 may detect the motion data of the at least one ROI in each of the images.

The motion data may be determined based on at least one of the camera cues, the image analysis, the viewing window, the motion of the electronic device 200, and the visual activity in the at least one image of the plurality of images. The at least one image, from the plurality of images, may be automatically discarded based on the at least one parameter. The parameter includes the motion parameters, the camera cues, the visual activity, and the quality. The camera cues are utilized for the face detection, the zoom ratio determination, and the auto focus determination. In the plurality of images, the high resolution image may be automatically replaced with the low resolution image based on the at least one parameter.

At step 430, the playback unit 208 may determine at least one playback rate for the images based on the motion data. At step 440, the playback unit 208 may play back the plurality of images based on the at least one playback rate. Each of the images from the plurality of images may be automatically played at varying playback rate based on the motion data. The user of the electronic device 200 may be alerted when the at least one playback rate is varied. The at least one playback rate at runtime may be varied based on the user feedback. At least one of the panning speed and the zoom ratio may be varied when each of the images from the plurality of images is automatically played back. The segment of images from the plurality of images may be automatically played at varying playback rate based on the motion data.

In an example, the playback unit 208 may play back the plurality of images with speeds in accordance to the score of the image. That is, higher scored images may be played at slower speeds (i.e., slow motion or slow playback rate) while the medium and lower scored segments may be played at faster speeds (i.e., high motion or high playback rate). Further, an editing environment may be provided to enhance certain key moment images for brightness and contrast manually. Further, exemplary embodiments may allow manual application of color filters, modification of playback speeds, and/or addition of audio effects in case of the user is unhappy with the automatic motion image generated.

The various actions, acts, blocks, steps, or the like in the flowchart 400*a* and other flowcharts may be performed in the order presented, in a different order or simultaneously. Further, in some embodiments, some of the actions, acts, blocks, steps, or the like may be omitted, added, modified, skipped, or the like without departing from the scope of the invention.

Figure 4B:
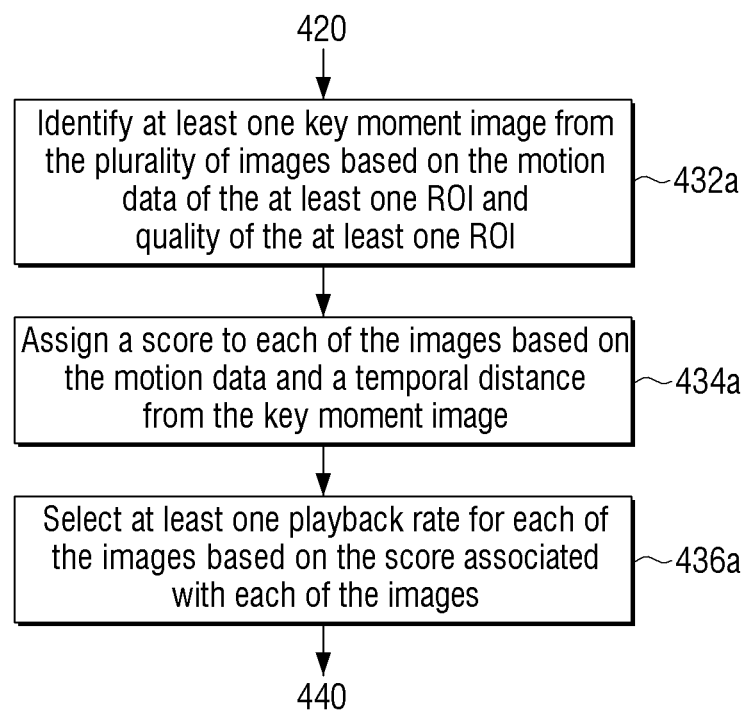
FIG. 4B is a flowchart for determining at least one playback rate for each image based on motion data, according to an exemplary embodiment.

FIG. 4B is a flowchart for determining the at least one playback rate for the images based on the motion data, according to an exemplary embodiment. At step 432*a*, the playback unit 208 may identify the at least one key moment image from the plurality of images based on the motion data of the at least one ROI and the quality of the at least one ROI. At step 434*a*, the playback unit 208 may assign the score to each of the images based on the motion data and the temporal distance from the key moment image. The method for generating the score to each of the images is explained in conjunction with FIG. 2.

At step 436*a*, the playback unit 208 may select the at least one playback rate for the images based on the score associated with each of the images, and then the method proceeds to step 440.

Figure 4C:
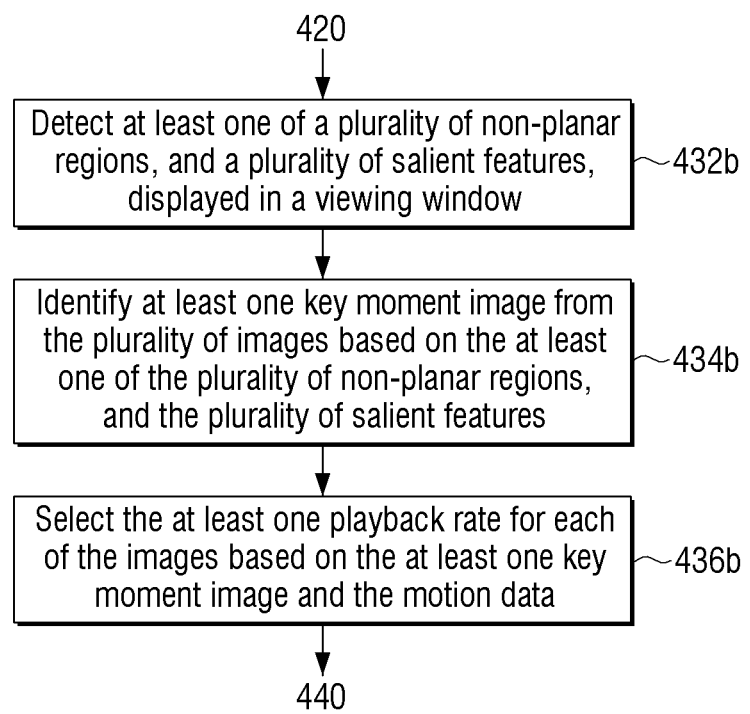
FIG. 4C is a flowchart illustrating another method for determining at least one playback rate for each image based on at least one key moment image and motion data, according to an exemplary embodiment.

FIG. 4C is a flowchart for determining the at least one playback rate for the images based on the at least one key moment image and the motion data, according to an exemplary embodiment.

At step 432*b*, the playback unit 208 may detect at least one of the plurality of non-planar regions, and the plurality of salient features, displayed in the viewing window.

At step 434*b*, the playback unit 208 may identify the at least one key moment image from the plurality of images based on the at least one of the feature detection, the plurality of non-planar regions, and the plurality of salient features.

At step 436*b*, the playback unit 208 may select the at least one playback rate for the images based on the at least one key moment image and the motion data, and the method proceeds to step 440.

Figure 4D:
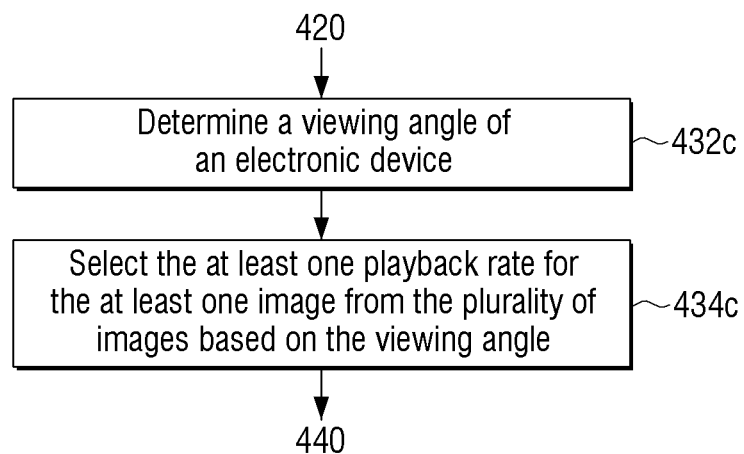
FIG. 4D is a flowchart for determining at least one playback rate for each image based on a viewing angle, according to an exemplary embodiment.

FIG. 4D is a flowchart for determining the at least one playback rate for the images based on the viewing angle, according to an exemplary embodiment. At step 432*c*, the playback unit 208 may determine the viewing angle of the electronic device 200.

At step 434*c*, the playback unit 208 may select the at least one playback rate for the at least one image from the plurality of images based on the viewing angle and method performs step 440. The method may then proceed to step 440.

Figure 4E:
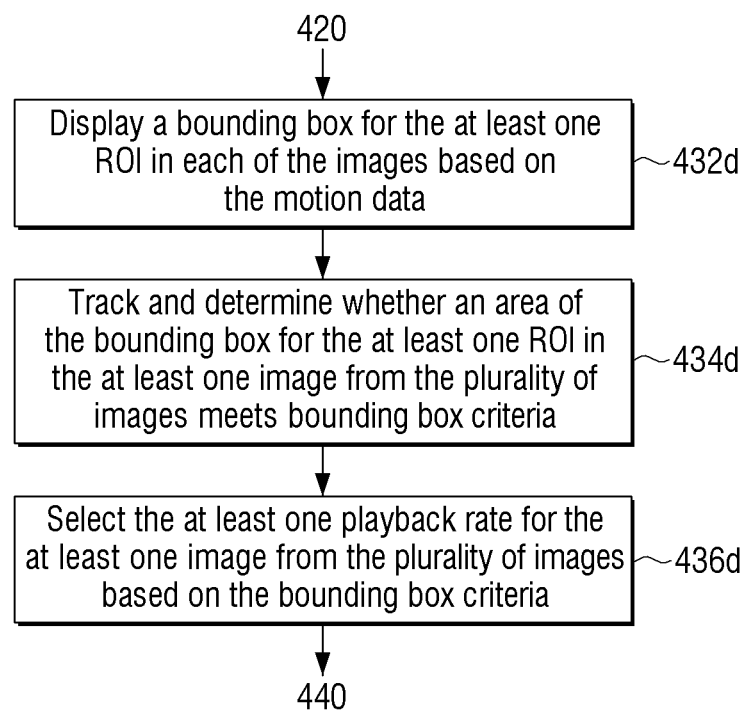
FIG. 4E is a flowchart for determining at least one playback rate for each image based on a bounding box criteria, according to an exemplary embodiment.

FIG. 4E is a flowchart for determining the at least one playback rate for the images based on a bounding box criteria, according to an exemplary embodiment. At step 432*d*, the method includes displaying a bounding box for at least one ROI in each of the images based on the motion data. At step 434*d*, the method includes tracking and determining whether an area of the bounding box for the at least one ROI in the at least one image from the plurality of images meets bounding box criteria.

At step 436*d*, the playback unit 208 may select the at least one playback rate for the at least one image from the plurality of images based on the bounding box criteria, and the method may proceed to step 440.

Figure 5:
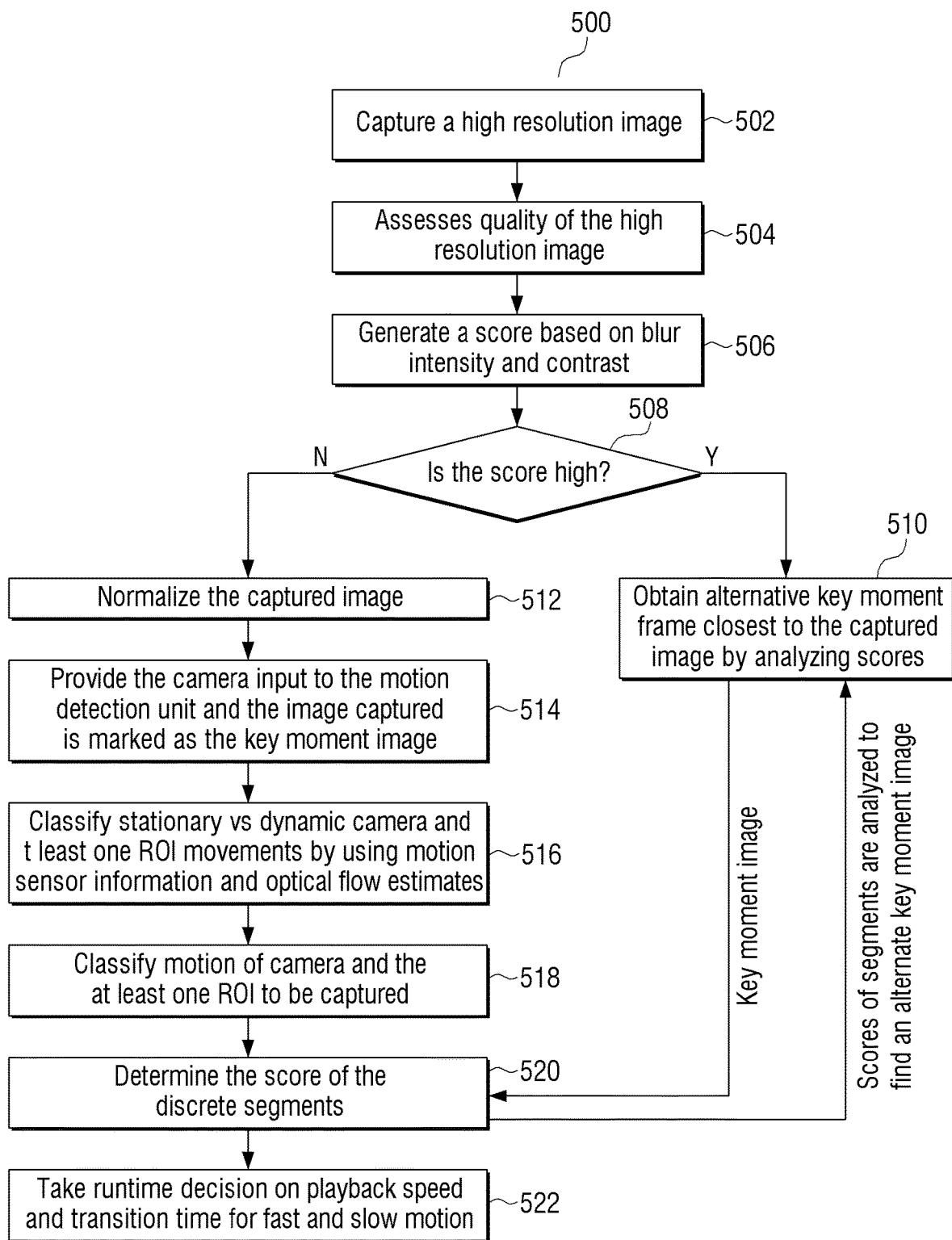
FIG. 5 shows an example flowchart illustrating a method for taking runtime decision on a playback rate and a transition time for fast and slow motion, according to an exemplary embodiment.

FIG. 5 shows an example flowchart 500 for taking runtime decision on a playback rate and a transition time for fast and slow motion, according to an exemplary embodiment. At step 502, the image capturing unit 202 may capture a high resolution image. In an example, to capture motion information alongside the still image, pertaining to every shot, about 90 frames before and about 30 frames after the capture may be cached. Overall, there are about 120 frames of a slightly lower resolution available that are to be analyzed apart from the high resolution image.

At step 504, the controller 204 may assess quality of the high resolution image. In an example, the high resolution image is fed to the controller 204 to identify out-of-focus blur, motion blur distortion, and blurring from extreme light intensity. Further, the controller 204 may extract the blurred regions and the quality of the high resolution image is assessed.

At step 506, the controller 204 may generate a score based on the blur intensity and the contrast. In an example, initially, the high resolution image is analyzed and the score is generated which represents the blur intensity value. At step 508, if it is determined that the score of the image is high (i.e., higher than a threshold value), then, at step 510, the controller 204 may obtain an alternate key moment image closest to the captured high resolution image by analyzing the scores.

At step 508, if it is determined that the score of the image is low (i.e., lower than a threshold value), then, at step 512, the controller 204 may normalize the captured image. In an example, for the image with poor contrast values, normalization or contrast stretching or histogram stretching is applied to enhance the image by improving the contrast. The images obtained after normalization is categorized as the key moment image around which the playback rate is modeled.

At step 514, the controller 204 may provide the camera input (i.e., about 90 frames before still image and 30 frames after the still image) to the motion detection unit 206 and the image captured is marked as the key moment image. At step 516, the controller 204 may classify as stationary or moving camera and the at least one ROI (i.e., object) movements using motion sensor information and optical flow estimates.

At step 518, the controller 204 may classify the motion of the image capturing unit 202 and the at least one ROI to be captured. In an example, the motion can be as described below:

(1) the image capturing unit 202 is stationary and the at least one ROI is stationary, (2) the image capturing unit 202 is moving and the at least one ROI is stationary, (3) the image capturing unit 202 is stationary—the at least one ROI is moving, and (4) the image capturing unit 202 and the at least one ROI are moving.

At step 520, the controller 204 may receive the key moment image and determine the score of the discrete segments and step 510 is performed. At step 522, the playback unit 208 may take runtime decision on the playback rate and transition time for the fast and slow motion.

In an example, the scores obtained are considered to determine the alternate key moment image. The image with the motion scores beyond a certain threshold closest to the captured image is selected as the new key moment image for subsequent analysis and playback. The score data and timestamp of transition from fast-slow motion in the first 90 images and transition from slow-fast motion in the subsequent images after the key moment image is written into the header which is further parsed by the motion detection unit 206 while playback. The metadata stored in the encoded file is parsed by the playback unit 208 to take runtime decisions on the playback rate for all the images of the digital moving image. From the metadata stored by the motion detection unit 206, the varying playback rate at which the content needs to be played out is fed to the playback unit 208. Further, video stabilization is performed to remove other extraneous jitters and unwanted small movements of the image capturing unit 202 that might not have been taken into account by the motion detection unit 206.

Figure 6A:
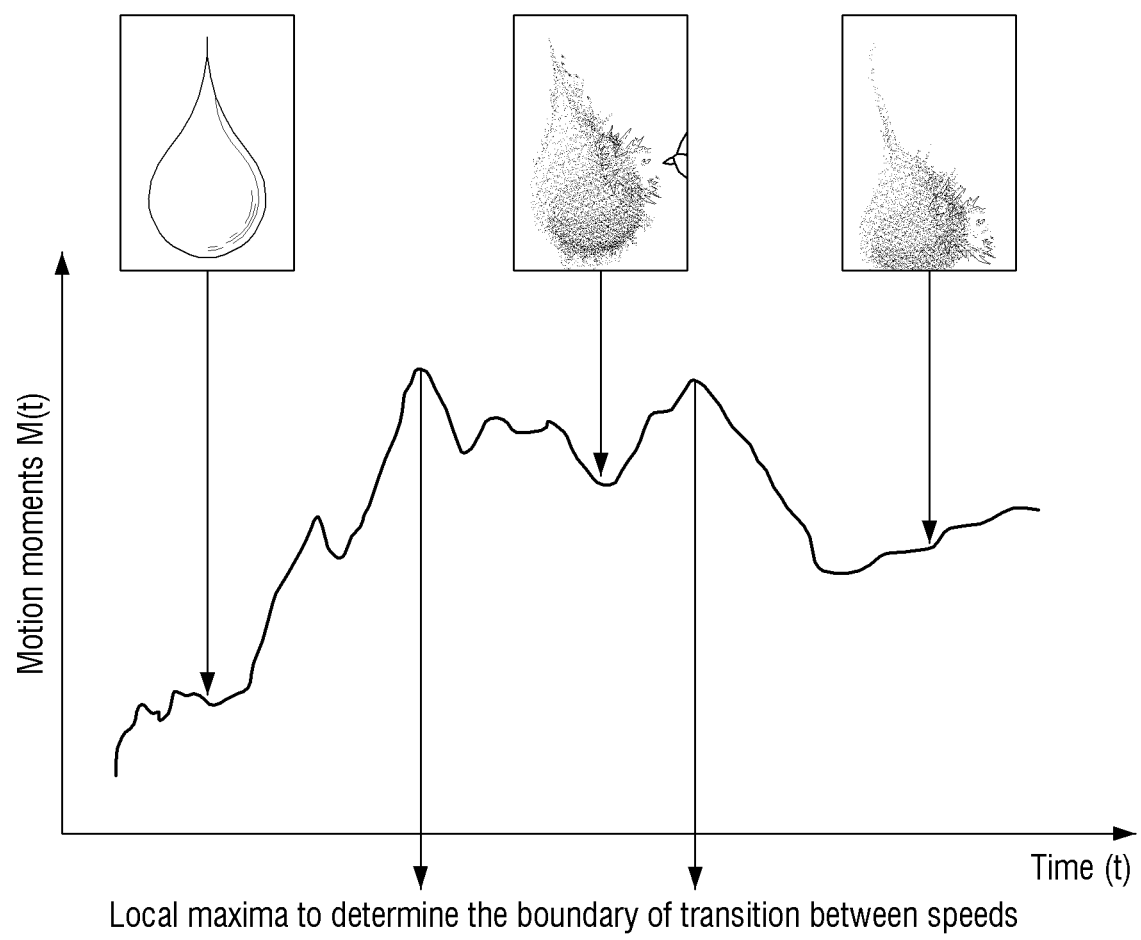
FIG. 6A illustrates an example scenario of motion data analysis in which at least one ROI (i.e., object) is moving and camera (i.e., image capturing unit) is stationary, according to an exemplary embodiment.

FIG. 6A illustrates an example scenario of motion data analysis in which the at least one ROI (i.e., object) is moving and the camera (i.e., image capturing unit 202) is stationary, according to an exemplary embodiment. As shown in FIG. 6A, the camera cues (or sensor cues) are not relevant as the image capturing unit 202 is stationary and they are not considered in computing motion metrics (i.e., motion data). A motion metric M(t) for each of the image at time t is computed. The M(t) is computed by sum of magnitudes of the components of optical flow at each pixel as the motion metric for the image at time t.

Further, a local minima of M(t) with respect to time t for the curve starting at t=0 are identified, as shown in FIG. 6A. For example, a local minimum may be identified between two local maxima M1 and M2 of the curve so that the difference between the M1 and M2 is at least N % from the M(t) value for M1. If this condition is not met, the method selects next M2 as the current M1 and identifies the next M2. This way, it progressively moves across the M(t) curve to determine the local minima of motion between significant peaks determined by the N % criterion. These peaks determine the level of motion activity for the shot captured.

Further, the images are played in slow motion between two significant peaks of curve of M(t) with respect to time t. The images lying outside the boundary are played with fast motion. The slow motion regions are modeled around the key moment image captured and the value of the M(t) for key moment image is calculated accordingly to be identified as the local maxima satisfying the N % criterion as described in FIG. 8. The optical flow estimates allow for tracking the temporal correspondence across frames by tracking feature descriptors and the temporal data is used to enhance the contrast of regions with temporal motion across all the images for a better viewing experience.

Figure 6B:
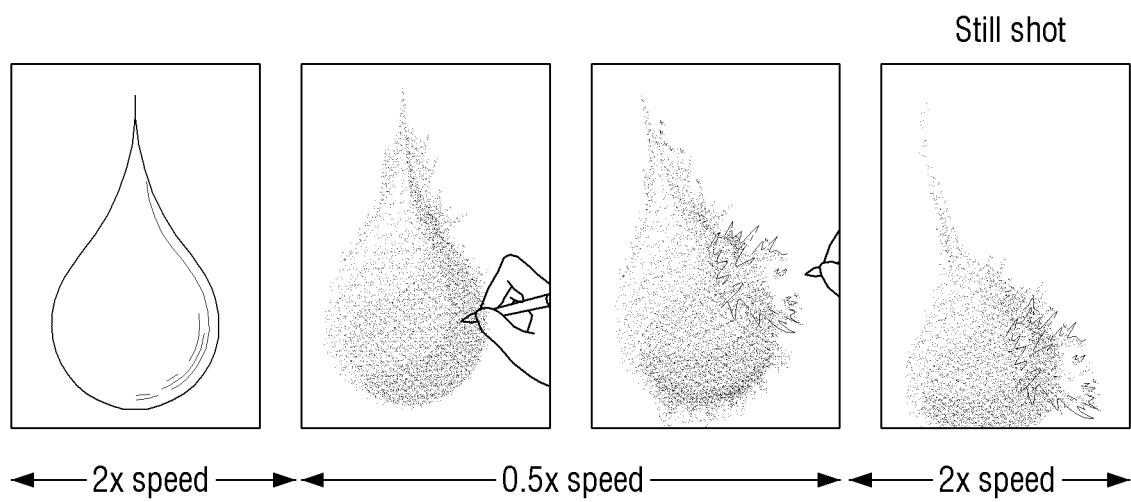
FIG. 6B illustrates an example scenario in which a lapse effect is created by varying a playback rate based on content and a still shot, according to an exemplary embodiment.

FIG. 6B illustrates an example scenario in which a lapse effect is created by varying the playback rate based on content and a still shot, according to an exemplary embodiment. As shown in FIG. 6B, the first 90 images are played at a higher (2×) playback rate, next 30 images are played with a slower (0.5×) playback rate, and subsequent images are played with the higher (2×) speed.

Figure 7:
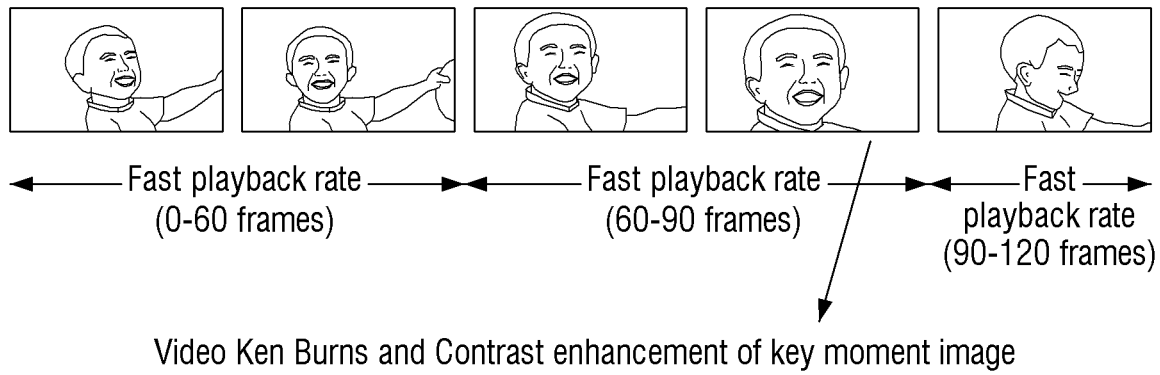
FIG. 7 illustrates an example scenario of motion data analysis in which an object and camera are stationary, according to an exemplary embodiment.

FIG. 7 illustrates an example scenario of motion data analysis in which the object and the camera are stationary, according to an exemplary embodiment. Consider a scenario where the object is stationary and the camera (i.e., image capturing unit 102) is stationary. In this scenario, initially, the camera captures the plurality of images, about 90 images before capturing the still shot and about 30 images after capturing the still shot of the image. Overall, there are about 120 images of the slightly lower resolution images available that are to be analyzed apart from the captured still shot image. Further, the contrast of the key moment image is enhanced.

As shown in FIG. 7, the frames are analyzed for the face regions and gradual zoom-in, zoom-out effect is applied. The gradual zoom-in and zoom-out effect is referred to as Ken Burns effect. The first 60 images are played at the faster (2×) playback rate, the next 60-90 images are played at the slower (0.5×) playback rate, and the last 90-120 images are played with the faster (2×) playback rate. The captured image is used to replace the low resolution images for playing out the slow motion regions with Ken Burns effect.

Figure 8:
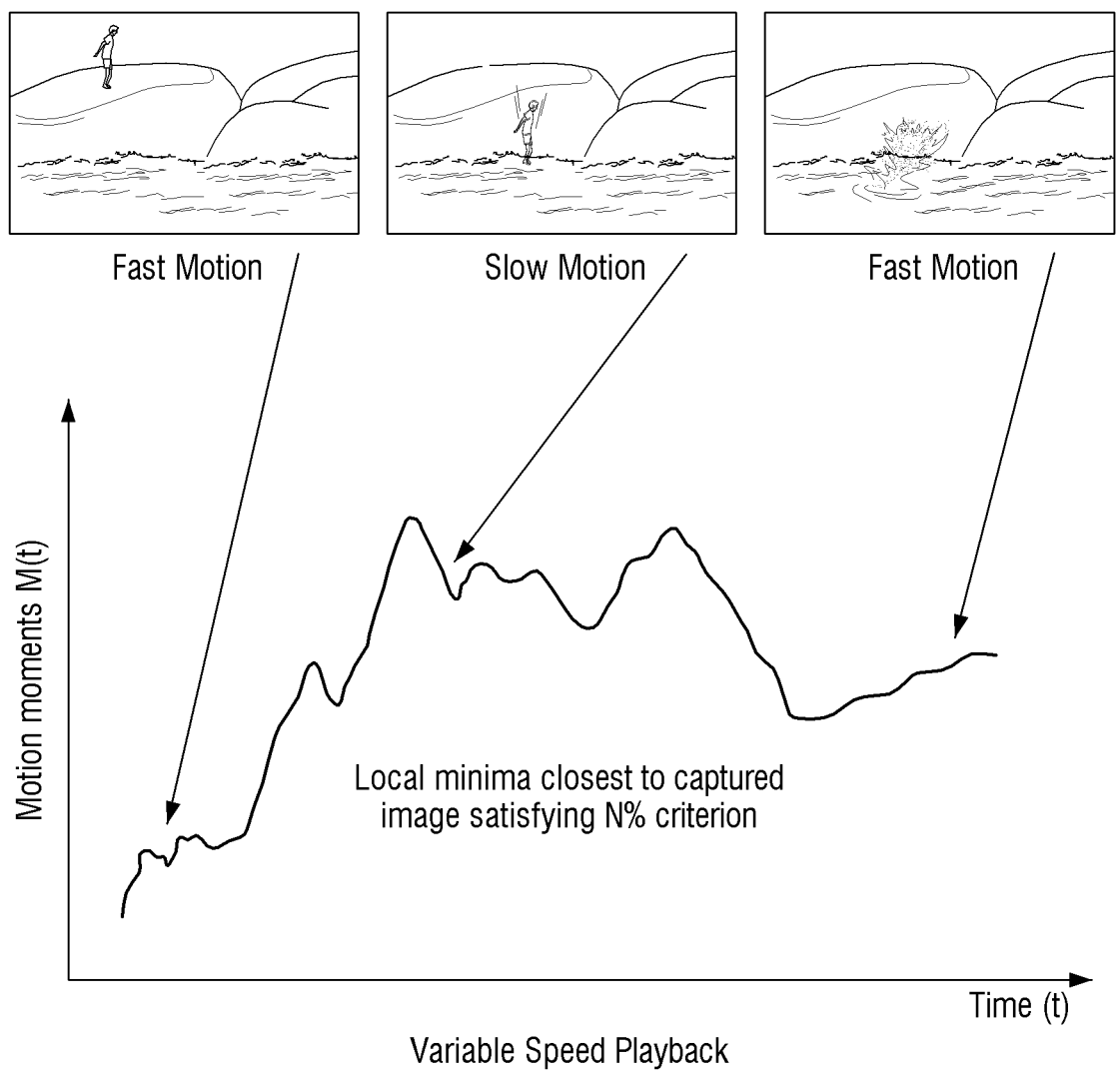
FIG. 8 illustrates an example scenario of motion data analysis in which an object is moving and camera is stationary, according to an exemplary embodiment.

FIG. 8 illustrates an example scenario of motion data analysis in which the object is moving and the camera is stationary, according to an exemplary embodiment. As shown in FIG. 8, the camera cues are not relevant as the camera is stationary and they are not considered in computing the motion data. The motion metric M(t) for each of the image at time t is computed. The M(t) is computed by sum of magnitudes of the components of optical flow at each pixel as the motion metric for the image at time t. Further, the local minima of M(t) with respect to time t for the curve starting at t=0 is identified as shown in FIG. 6B. For example, a local minimum may be identified to be between two local maxima M1 and M2 of the curve so that the difference between M1 and M2 is at least N % from the M(t) value for M1. If this condition is not met, the method selects M2 as the current M1 and identifies the next M2. This way it progressively moves across the M(t) curve to determine the local minima of motion between significant peaks determined by the N % criterion. These peaks determine the level of motion activity for the shot captured.

Further, the image is played in the slow motion between two significant peaks of curve of M(t) with respect to time t. The images lying outside the boundary are played with the fast motion. The slow motion regions are modeled around the key moment image captured and the value of the M(t) for key moment image is calculated accordingly to be identified as the local maxima satisfying the N % criterion.

Figure 9:
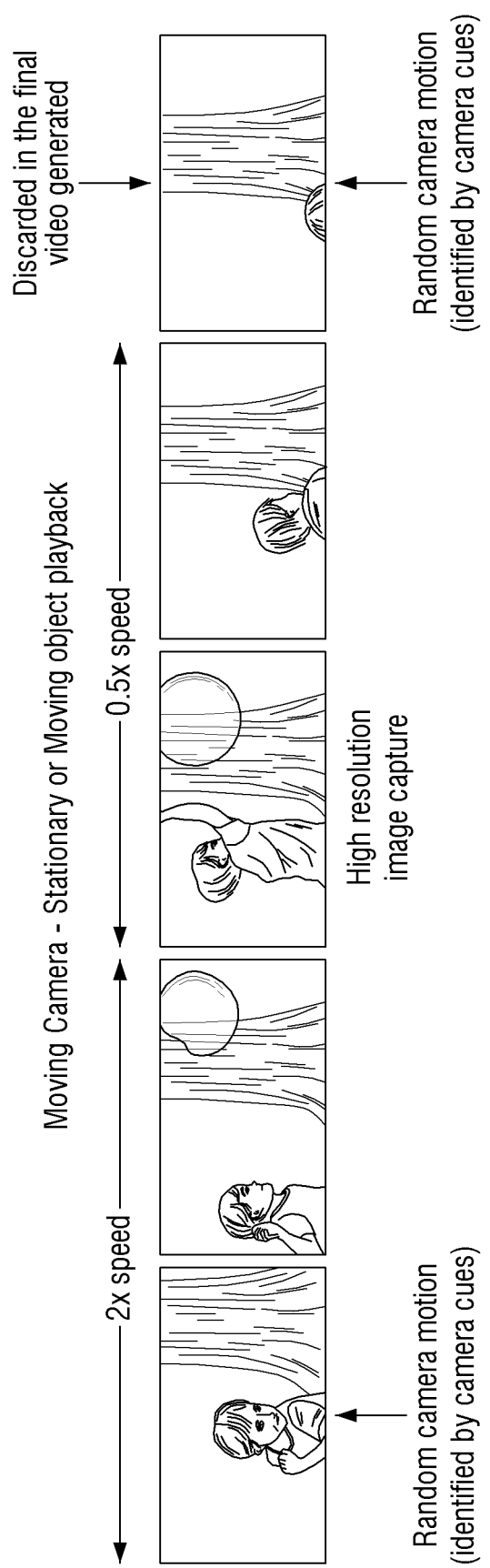
FIG. 9 illustrates an example scenario of motion data analysis in which camera is moving and an object is moving or stationary, according to an exemplary embodiment.

FIG. 9 illustrates an example scenario of motion data analysis in which the camera is moving and the object is moving or stationary, according to an exemplary embodiment. The camera cues are used to discard random movements captured unintentionally. For the images with the random motion which is detected using the camera cues, a decision is taken to discard the images or merge them into the fast region playback. The first few images are played with the fast playback rate, and the subsequent images which are modeled around the key moment image are played with the slow playback rate. Further, the last few images are played with the fast playback rate.

In order to determine the boundary of transition between the fast playback rate and the slow playback rate; and vice versa, the scores are assigned to each of the images based on the weighted average of the motion data, the face regions in the images, amount of the blurred content, and out of focus content. The images with the high scores correspond to the high motion activity or prominent face regions or smaller blur intensity values. Further, the images with the low scores correspond to the images with the less motion activity, unavailability of face regions, or high blur intensity values. To uniquely identify the transition point based on the scores, a cumulative score value is stored for every image and the curve is plotted against time. A higher first order differential or slope of the curve at a certain point implies a steep change in scores and simultaneously the higher motion activity.

Thus, the highest first order differential between the images (30, 60), f1, is determined as the transition boundary for the playback from the fast motion to the slow motion. Similarly, the highest first order differential between the images (90, 120), f2, is marked as the transition boundary for subsequent playback from the slow motion to the fast motion. Further, the images between f1 and f2 are played out in the slow motion. The camera cues passed by the image capturing unit 102 can be used to uniquely identify random motion captured. The camera framework identifies random motion captured which is passed onto the motion detection unit 206. For the images captured after the key moment image, if continuous images with the random motion are observed then, they are discarded from the final playback. This way the transition from the fast-slow motion and the slow-fast motion are uniquely identified by determining a first order differential and camera cues for the random motion.

Further, the camera cues are used to discard random movements and to identify the boundary of transition from the fast-slow playback and the slow-fast playback. For scoring the image in all scenarios, the controller 204 is used to detect the out-of-focus blur, motion blur distortion, and blurring from extreme light intensity captured in the frames in the images. The images with unintentional blurring are picked and discarded or played alongside the fast motion parts. Simultaneously, occlusion boundaries (self-occlusion or inter object occlusion), if detected, are given precedence to determine the boundary of transition from the fast playback to the slow playback and vice versa.

Figure 10:
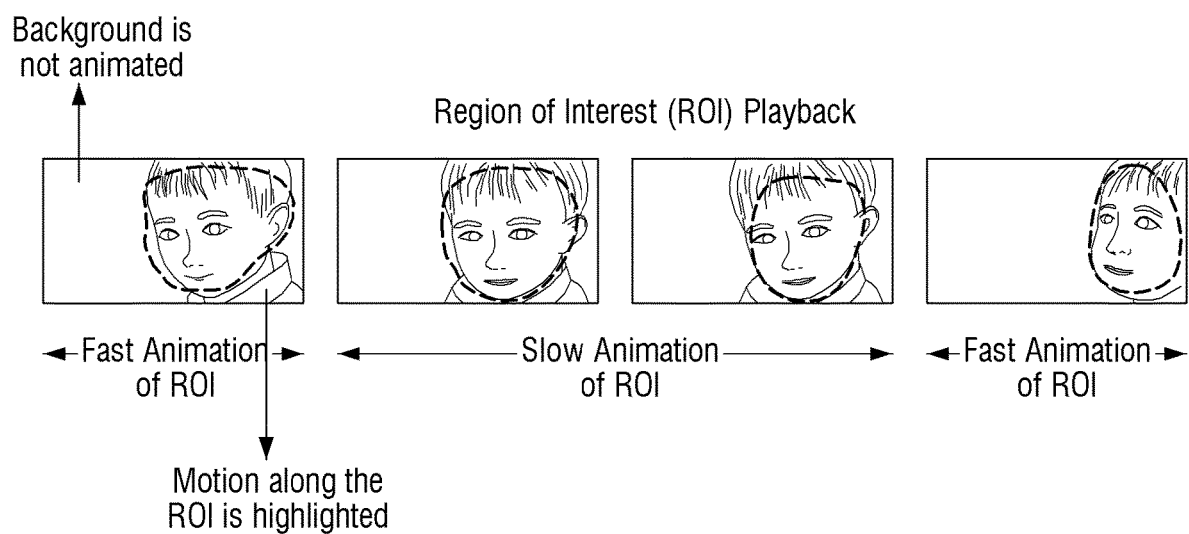
FIG. 10 illustrates an example scenario of ROI playback in which local regions across a plurality of images are animated, according to an exemplary embodiment.

FIG. 10 illustrates an example scenario of ROI playback in which local regions across the plurality of images are animated, according to an exemplary embodiment. The camera captures plurality of images and the captured images are analyzed to detect the face regions (i.e., ROI) in the images. As shown in FIG. 10, the motion along the ROI is highlighted. If the motion of the ROI is not detected then, fast animation of the ROI is performed and the background of the image is not animated. Further, if the motion of the ROI is detected then, the ROI in the image is animated in slow motion and the process is continued until all the images are animated.

Figure 11:
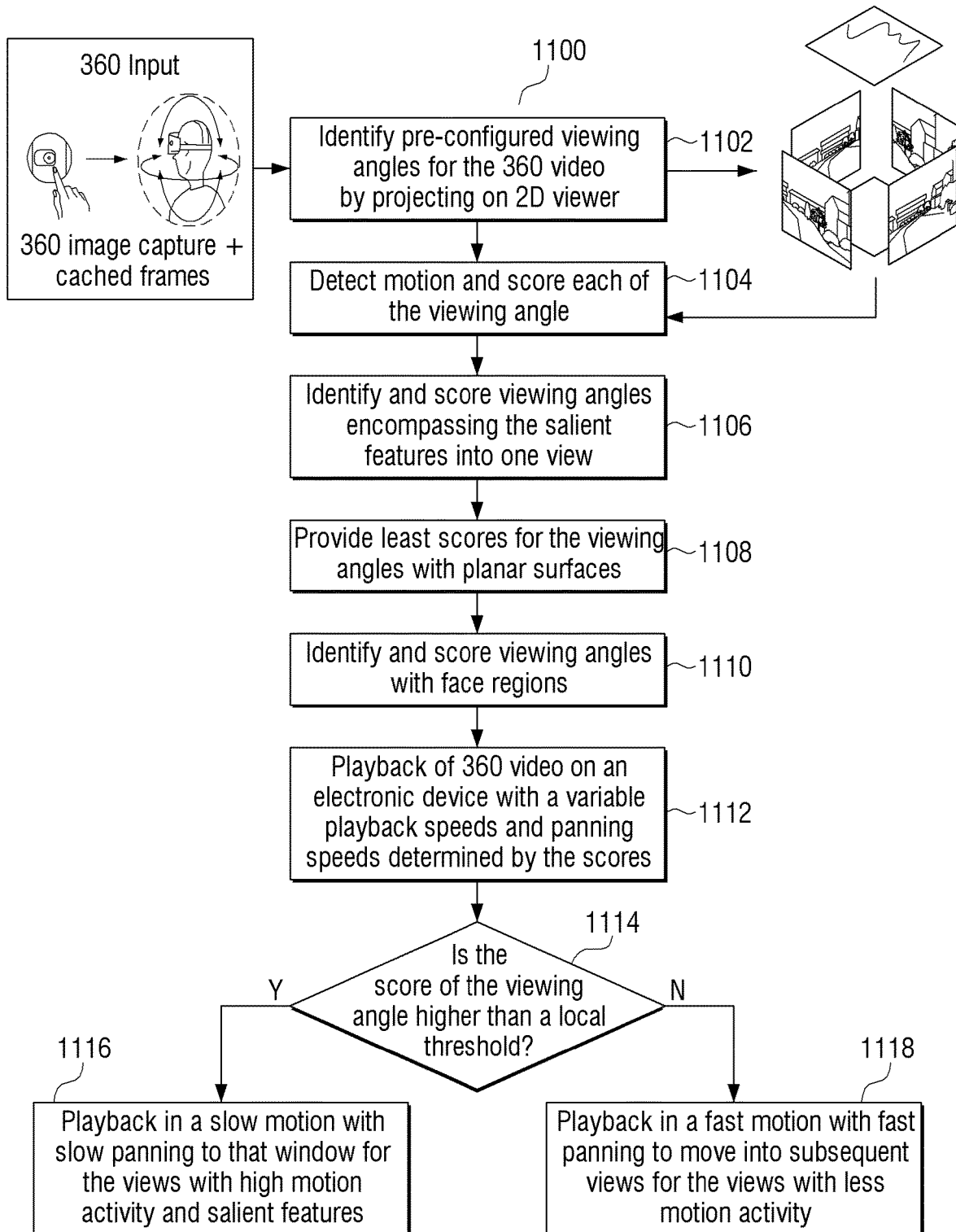
FIG. 11 shows an example flowchart illustrating a method for animating 360° images or spherical panoramas using visual effects and variable rate playback, according to an exemplary embodiment.

FIG. 11 shows an example flowchart 1100 for animating 360° images or spherical panoramas using visual effects and variable rate playback, according to an exemplary embodiment. Initially, a 360° image is captured and the frames are cached. At step 1102, the controller 204 may identify pre-configured viewing rectangles for the 360° video by projecting on a 2D viewer.

At step 1104, the motion detection unit 206 may detect the motion and score for each of the viewing window. At step 1106, the controller 204 may identify and score the windows encompassing the salient features into one view.

At step 1108, the controller 204 may provide least scores for the viewing windows with planar surfaces. At step 1110, the controller 204 may identify and score the viewing windows with face regions.

At step 1112, the playback unit 208 may play back the 360° video on the electronic device 200 with the variable playback speeds and panning speeds determined by the scores. At step 1114, if it is determined that the score of the view higher than a local threshold then, at step 1116, the playback unit 208 may play back in slow motion with slow panning to that window for the view with the high motion activity and the salient features.

At step 1114, if it is determined that the score of the view is not higher than a local threshold then, at step 1118, the playback unit 208 may play back in fast motion with fast panning to move into subsequent views for the viewing windows with less motion activity.

Figure 12:
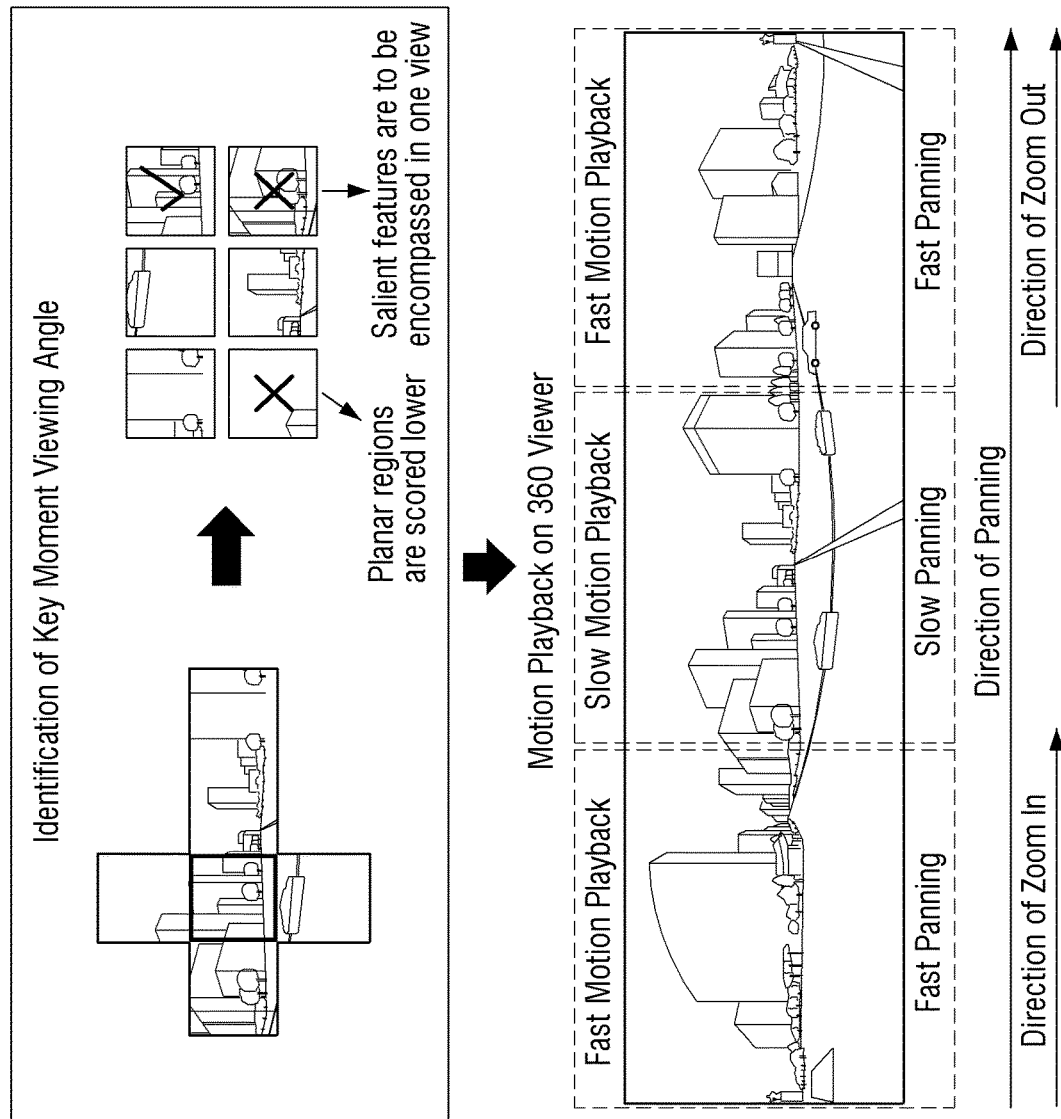
FIG. 12 shows an example scenario in which 360 images or spherical panoramas are played back around a key moment viewing window, according to an exemplary embodiment.

FIG. 12 shows an example scenario in which 360° images or spherical panoramas are played back around a key viewing window, according to an exemplary embodiment. As shown in FIG. 12, the 360° images or the spherical panoramas are rendered on a viewing device with only a portion of the content being visible to the user. The window viewed by the user has playback speeds correlating to the motion information for that particular window.

Figure 13:
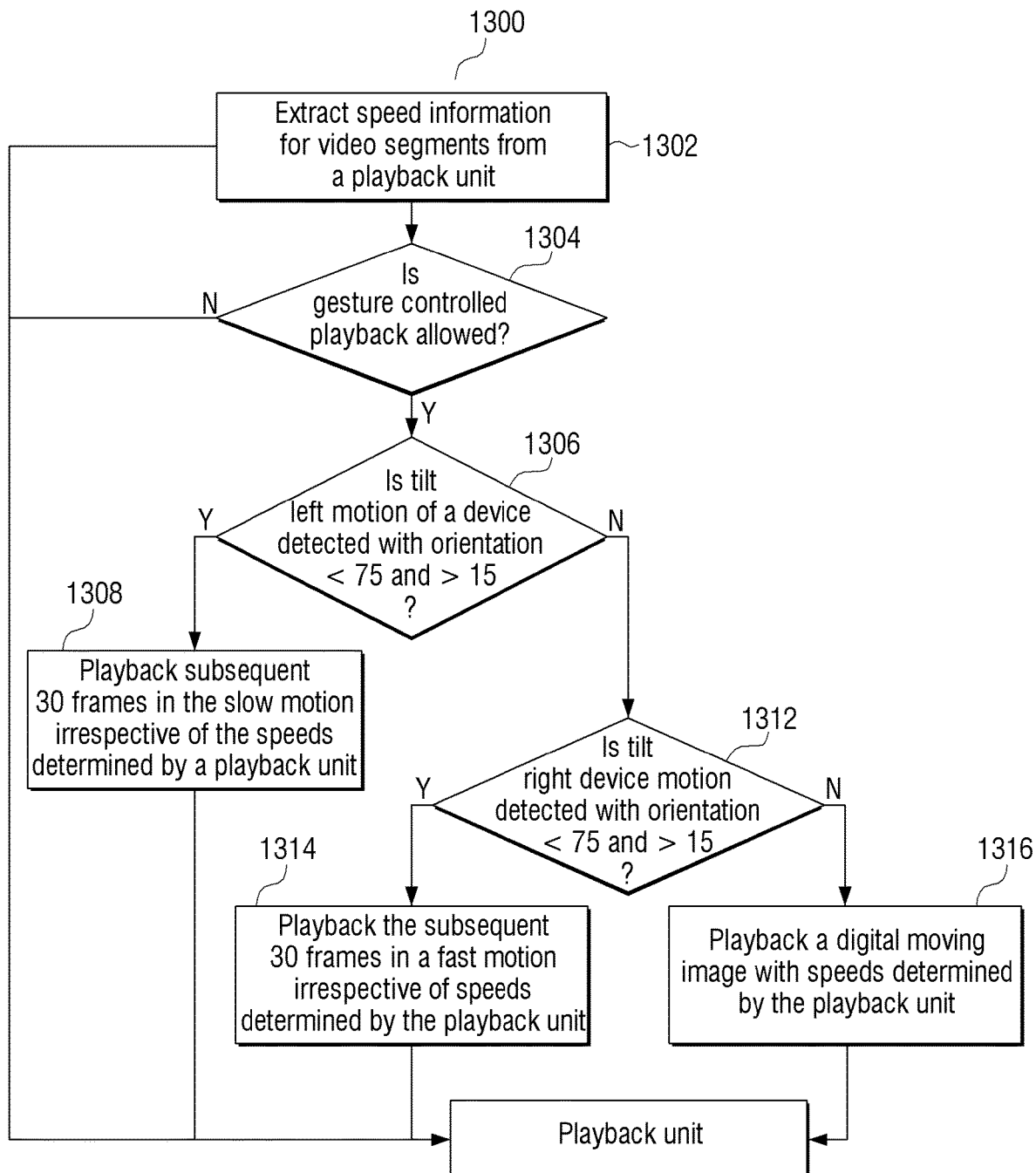
FIG. 13 shows an example flowchart for managing a playback rate of a plurality of images based on a tilt of an electronic device, according to an exemplary embodiment.

FIG. 13 shows an example flowchart 1300 for managing the playback rate of the plurality of images based on a tilt of the electronic device 200, according to an exemplary embodiment. At step 1302, the method includes extracting the speed information for the video segments from the playback unit 208. After extracting the speed information, the playback unit 208 (i.e., here the functionality of a renderer unit is performed by the playback unit 208) may be responsible for playing out the content at the speed determined. At step 1304, if it is determined that the gesture controlled playback is allowed, then, at step 1306, the method includes determining whether a tilt left motion of the electronic device 200 is detected with an orientation of less than 75° and greater than 15°. At step 1306, if it is determined that the tilt left motion of the electronic device 200 is detected with the orientation of less than 75° and greater than 15°, then, at step 1308, the playback unit 208 may play back subsequent 30 frames in the slow motion irrespective of the speeds determined by the playback unit 208.

At step 1306, if it is determined that the tilt left motion of the electronic device 200 is detected with an orientation of greater than 75° less than 15°, then, at step 1312, the playback unit 208 may detect a tilt right motion of the electronic device 200. At step 1312, if it is determined that the tilt right motion of the electronic device 200 is detected with an orientation of less than 75° and greater than 15°, then at step 1314, the playback unit 208 may play back the subsequent 30 frames in the fast motion irrespective of the speeds determined by the playback unit 208.

At step 1312, if it is determined that the tilt right motion of the electronic device 200 is detected with an orientation of greater than 75° or less than 15°, then, at step 1316, the playback unit 208 may play back the digital moving image with speeds determined by the playback unit 208. The various numbers suggested in the flowchart of FIG. 13 (e.g., 15°, 75°, 30 frames, etc.) are merely exemplary and may be substituted with other numbers (e.g., 20°, 80°, 20 frames, etc.) without departing from the scope of the disclosure.

Figure 14:
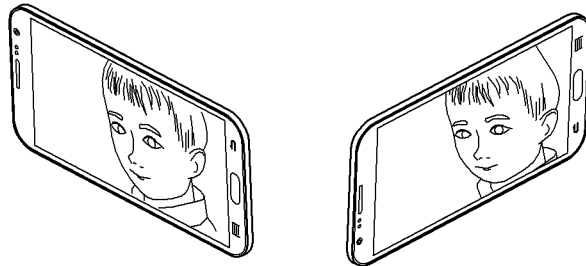
FIG. 14 shows an example scenario in which an image is played back based on a tilt of an electronic device, according to an exemplary embodiment.

FIG. 14 shows an example scenario in which the image is played back based on the tilt of the electronic device 200, according to an exemplary embodiment. As shown in FIG. 14, after detecting the tilt left motion of the electronic device 200, the image is played back in slow motion (i.e., slow playback rate). Further, after detecting the tilt right motion of the electronic device 200, the image is played back in fast motion (i.e., fast playback rate).

Figure 15A:
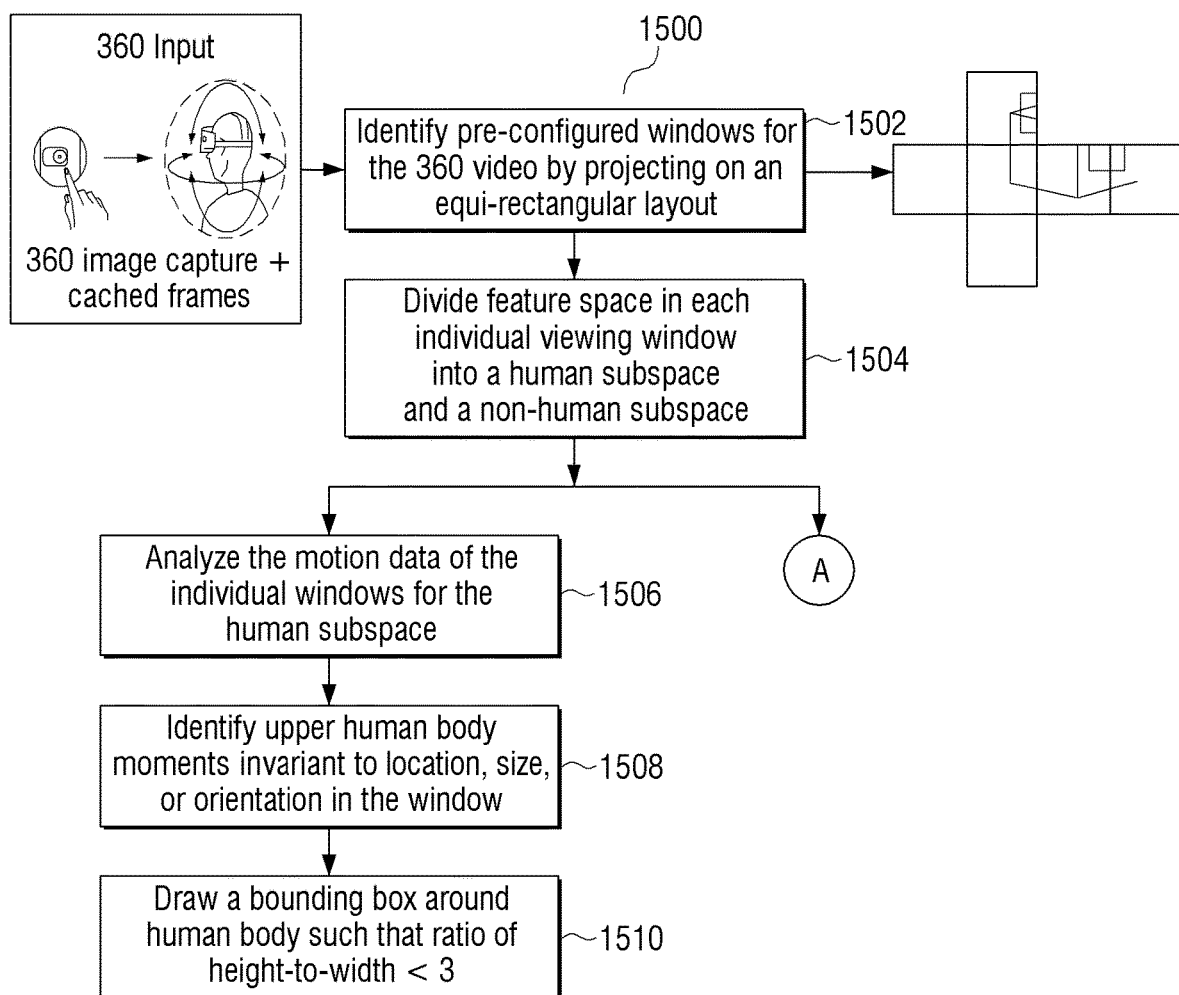
FIGS. 15A and 15B illustrate an example flowchart for managing a playback rate of a plurality of images while the images are played back on a virtual reality (VR) head-mounted display device, according to an exemplary embodiment.
Figure 15B:
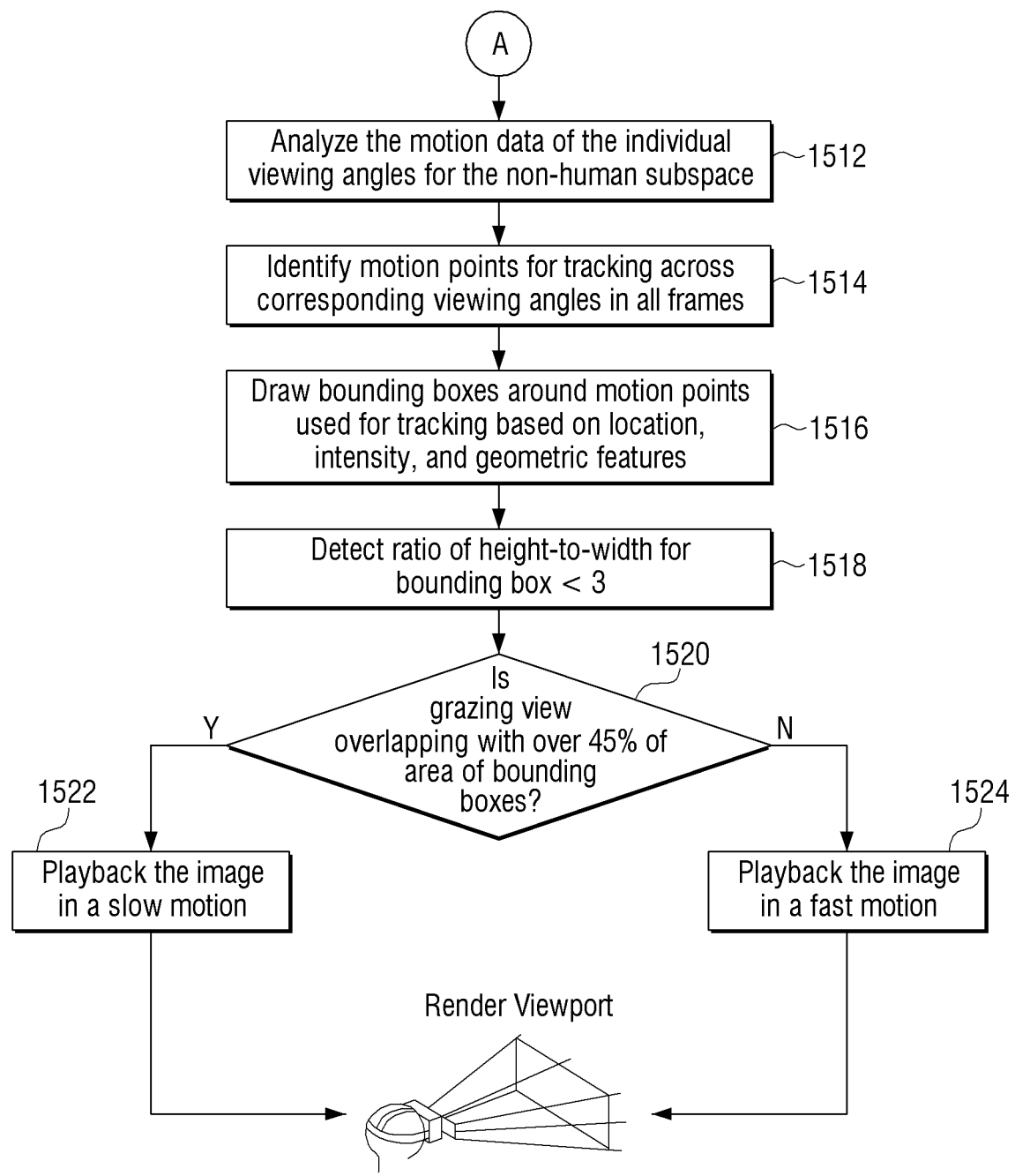

FIGS. 15A and 15B illustrate an example flowchart 1500 for managing the playback rate of the plurality of images while the images are played back on a VR head-mounted display device, according to an exemplary embodiment as disclosed herein. Initially, gear 360° image is captured and the frames are cached. At step 1502, the method includes identifying the pre-configured viewing windows for the 360° video by projecting on an equirectangular layout.

At step 1504, the method includes dividing the feature space in each individual viewport into a human subspace and a non-human subspace. At step 1506, the method includes analyzing the motion data of the individual viewports for the human subspace. At step 1508, the method includes identifying upper human body moments invariant to location, size, or orientation in the viewing window. At step 1510, the method includes drawing the bounding box around human body moments such that ratio of height-to-width is less than 3 (i.e., <3) although a different threshold value for the height-to-width ratio may be used. The example scenario showing the bounding boxes around the upper human body is explained in conjunction with FIG. 16A.

At step 1512, the method includes analyzing the motion data of the individual viewing windows for the non-human subspace. At step 1514, the method includes identifying the motion points for tracking across corresponding views in all the frames. At step 1516, the method includes drawing the bounding boxes around the motion points used for tracking based on the location, the intensity, and the geometric features. At step 1518, the method includes detecting that the ratio of the height-to-width for the bounding box is less than 3 although a different threshold value for the height-to-width ratio may be used.

At step 1520, if it is determined that the grazing view is overlapping with over 45% of the area of the bounding boxes then, at step 1522, the method includes rendering the viewport and playing back the view in the slow motion. At step 1520, if it is determined that the grazing view does not overlap with over 45% of the area of the bounding boxes, then, at step 1524, the method includes rendering the viewport and playing back the view in the fast motion. A different threshold value for the overlapping grazing view, other than 45%, may be used.

Figure 16A:
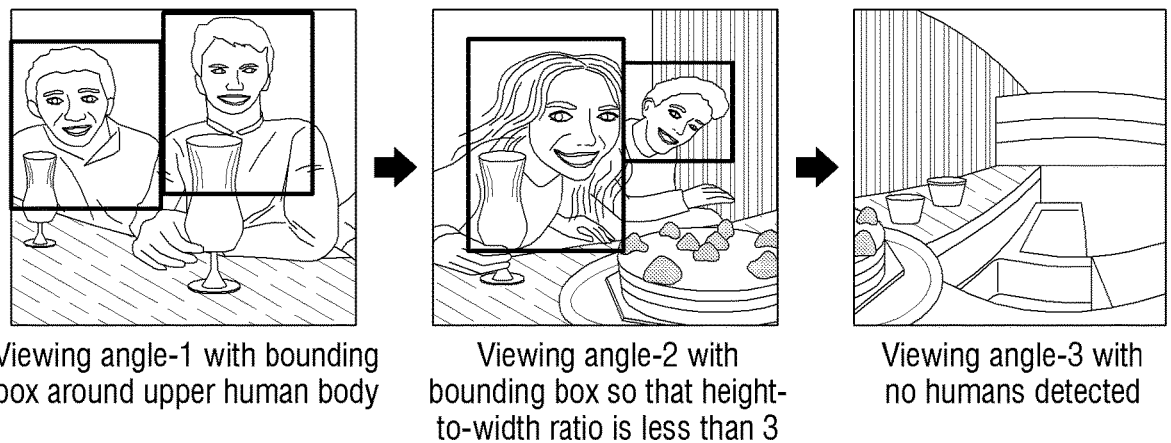
FIG. 16A shows an example scenario in which bounding boxes are indicated around a human body in an image, according to an exemplary embodiment.

FIG. 16A shows an example scenario in which the bounding boxes are indicated around a human body in the image, according to an exemplary embodiment. A viewing angle-1 with the bounding box around the upper human body, a viewing angle-2 with the bounding box so that the height-to-width ratio is less than 3, and a viewing angle-3 with no humans detected are shown in FIG. 16A.

Figure 16B:
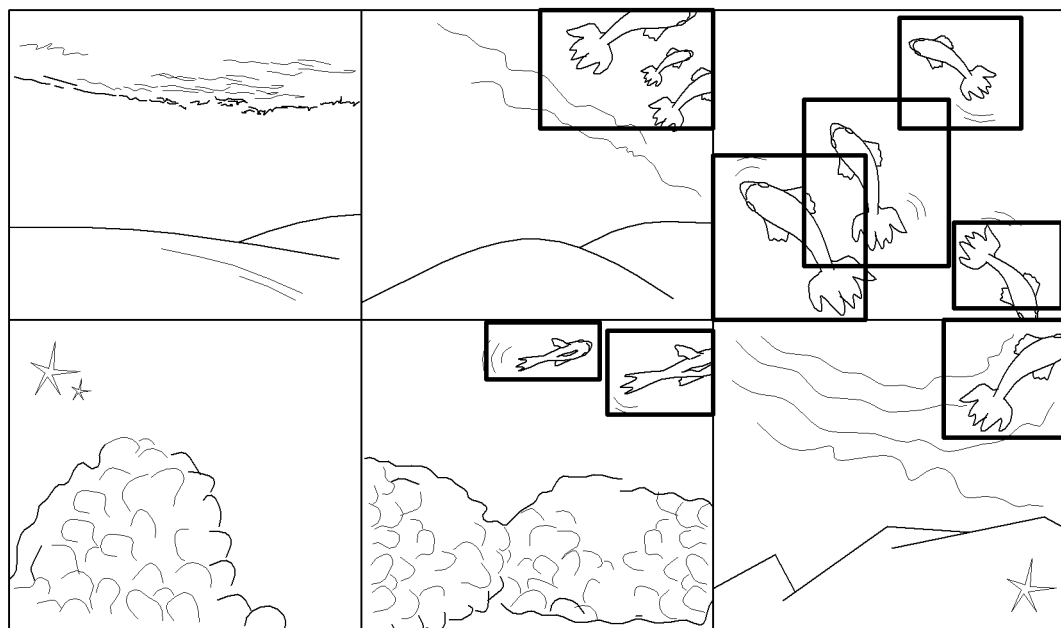
FIG. 16B shows an example scenario in which bounding boxes around motion points are indicated for multiple viewing angles, according to an exemplary embodiment.

FIG. 16B shows an example scenario in which bounding boxes around the motion points are indicated for multiple views, according to an exemplary embodiment. As shown in FIG. 16B, the bounding boxes around the motion points are drawn and used for tracking based on the location, the intensity, and the geometric features.

Figure 16C:
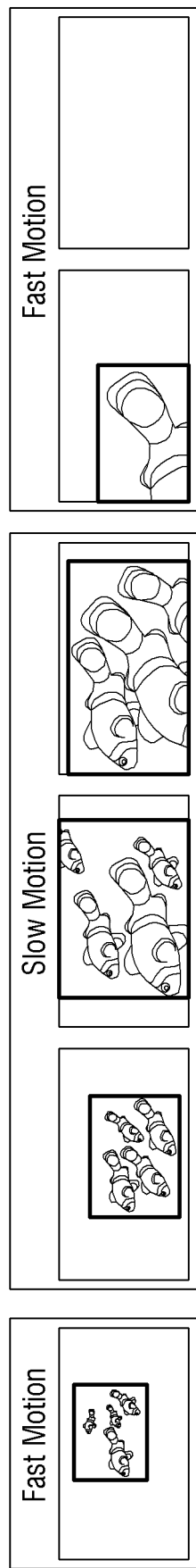
FIG. 16C shows an example scenario in which bounding boxes are indicated in users grazing window, according to an exemplary embodiment.

FIG. 16C shows an example scenario in which the bounding boxes are indicated in users grazing window, according to an embodiment as disclosed herein. As shown in FIG. 16C, after detecting that the grazing window is not overlapping with over 45% of area of the bounding boxes, the image is played back in fast motion. Further, after detecting that the grazing window is overlapping with over 45% of the area of the bounding boxes, the image is played back in slow motion.

Figure 17A:
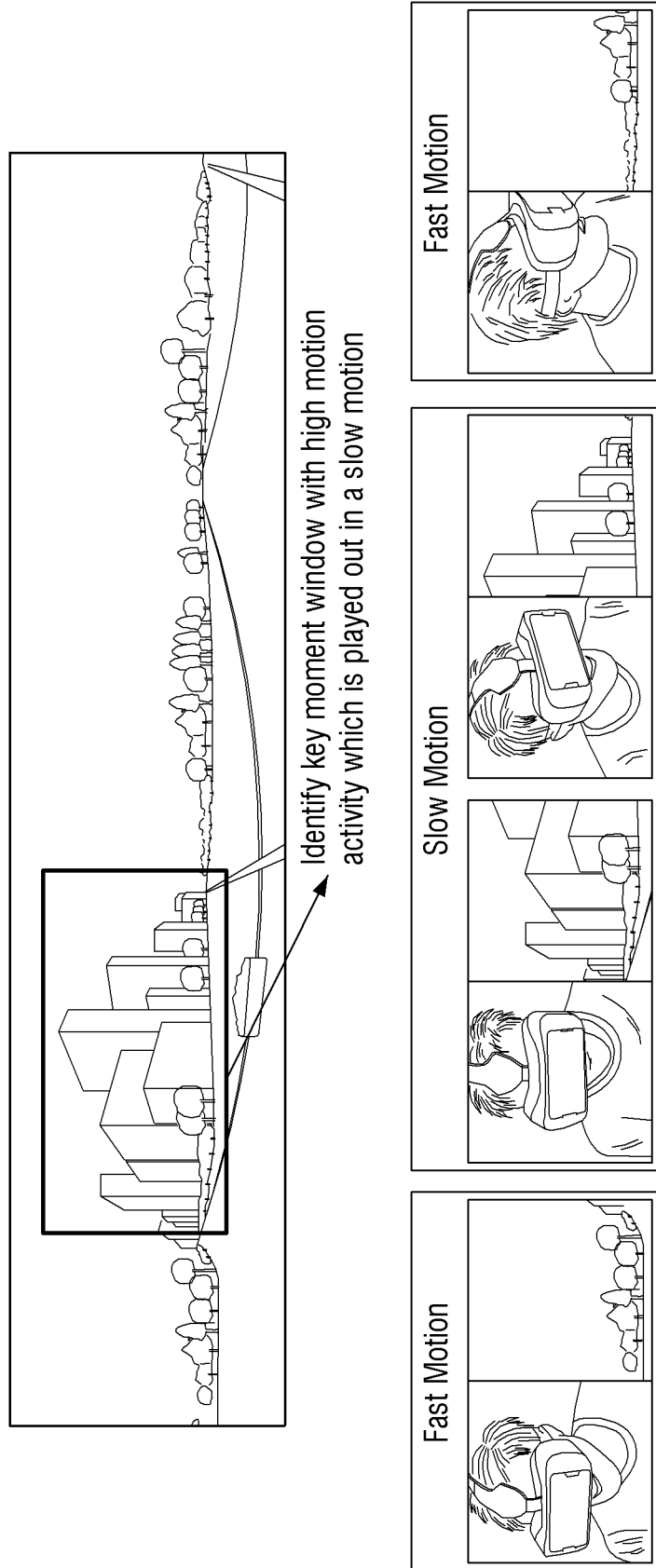
FIGS. 17A and 17B illustrate an example scenario in which the images are played back on a VR head-mounted display device, according to an embodiment as disclosed herein.
Figure 17B:
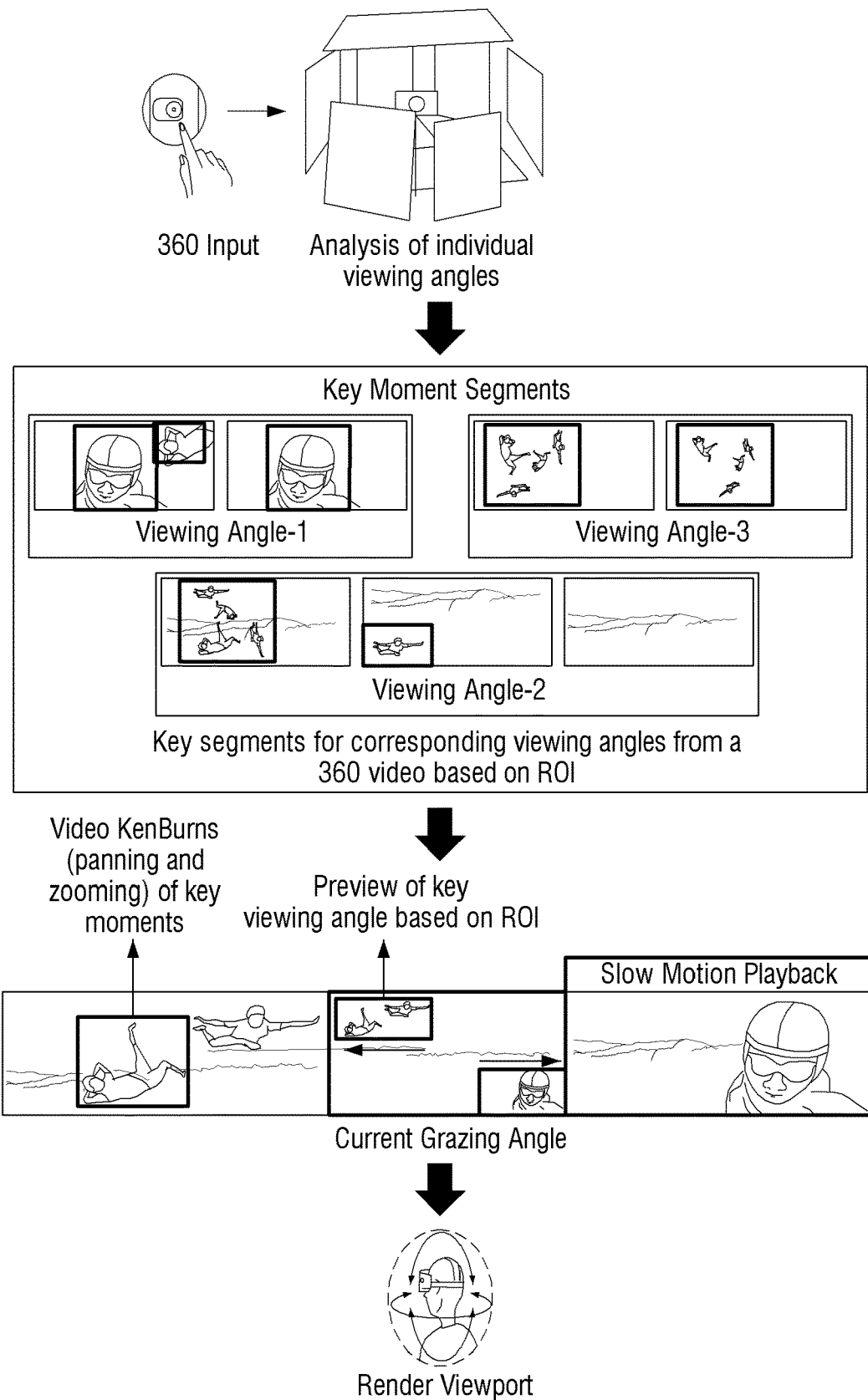

FIGS. 17A and 17B illustrate an example scenario in which the image is played back on a VR head-mounted display device, according to an embodiment as disclosed herein. As shown in FIG. 17A, the key moment viewing angle with the high motion activity is identified. The identified key moment viewing angle with the high motion activity in the image is played back in slow motion on the VR head-mounted display device as shown in FIG. 17A.

Further, as shown in FIG. 17B, other user experience (UX) elements may include guiding the user to view suitable windows which capture the key moment image at that instant of time. Pre-determined viewing windows are analyzed and the key segments are scored. These segments are displayed as thumbnails to guide the user to view the key moment image at runtime. The 360° image is captured and the frames are cached. The individual windows are analyzed for the motion data. The key segments (i.e., viewing angle-1, viewing angle-2, and viewing angle-3) for the corresponding viewing angles from the 360° video based on the ROI are extracted. The current grazing angle relates to the user's view which is a cropped window extracted from the entire content. The user's view might not always map to the key moments identified in the 360° content. An indication is provided to the user to view the key moments in the preview window as shown in FIG. 17B.

Figure 18:
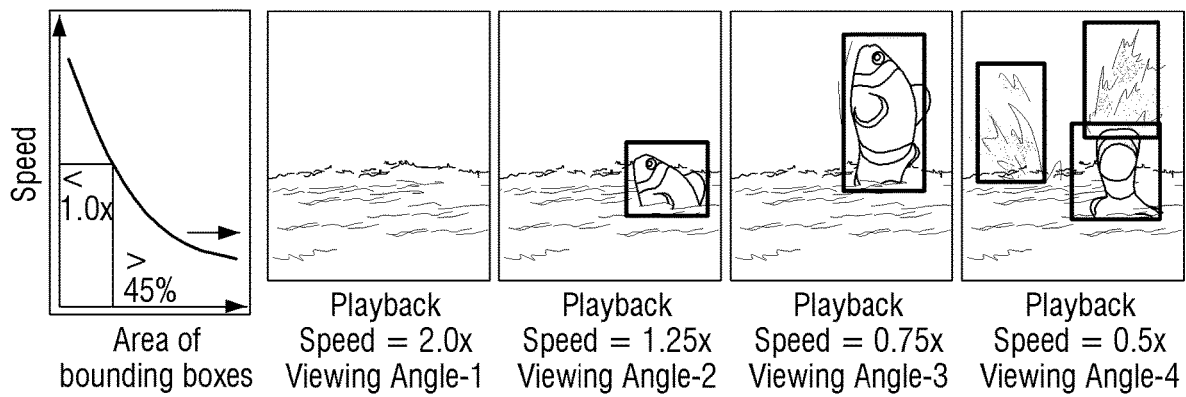
FIG. 18 shows an example scenario in which a playback rate for viewing windows is transitioned, according to an exemplary embodiment.

FIG. 18 shows an example scenario in which the playback rate for the viewing windows is transitioned, according to an exemplary embodiment. The playback rate is gradually reduced (i.e., fast motion to slow motion) as the total area of the bounding boxes in the view increases. As shown in FIG. 18, as there is no bounding box detected for the ROI in the viewing angle-1, the viewing angle-1 is played back with a playback speed of 2.0×. Further, after detecting the bounding box for the ROI in viewing angle-2, the viewing angle-2 is played back with the playback speed of 1.25×. Here, in the viewing angle-2, the area of the bounding box for the ROI is around 15% of the total area of the viewing angle-2. Further, after detecting the bounding box for the ROI in viewing angle-3, the viewing angle-3 is played back with the playback speed of 0.75×. Here, in the viewing angle-3, the area of the bounding box for the ROI is around 45% of the total area of the viewing angle-3. Further, after detecting the bounding box for the ROI in viewing angle-4, the viewing angle-4 is played back with the playback speed of 0.5×. Here, in the viewing angle-4, the area of the bounding box for the ROI is around 75% of the total area of the viewing angle-4.

Figure 19A:
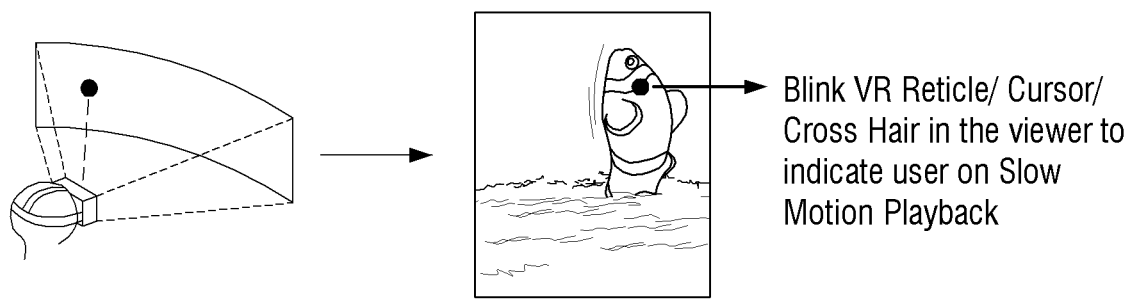
Figure 19B:
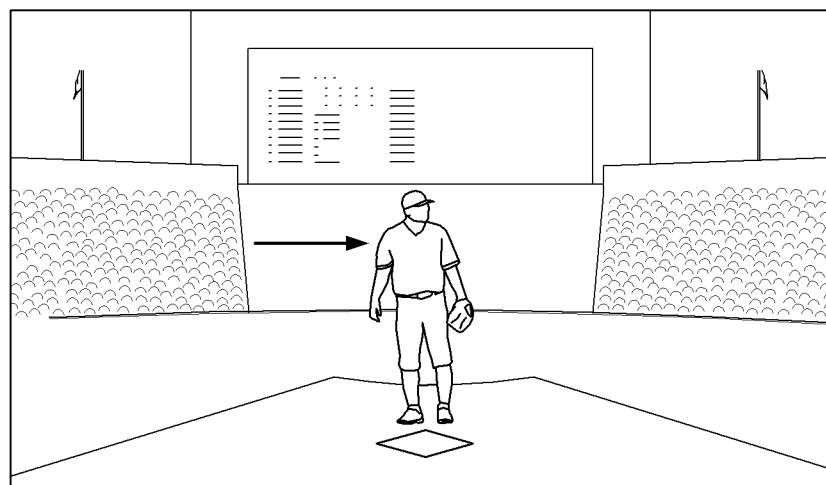

FIGS. 19A-19C illustrate an example scenario in which the user of the electronic device 200 is alerted when the playback rate is varied, according to an exemplary embodiment disclosed herein. The reticle or the cursor in the viewer blinks each time the playback speed is switched to the slow motion to prompt the user. As shown in FIG. 19A, the reticle, the cursor, or crosshair in the viewer is blinked to indicate the user on the slow motion playback.

As shown in FIG. 19B, the arrows may be used to point the salient moving objects in the viewport. Further, the arrows may indicate the direction to look at in the grazing window to indicate that motion is detected and is played in slow motion. As shown in FIG. 19C, the pop-up window in the VR view is displayed to alert the user on switching the speeds and is displayed at the start of the playback.

Figure 20:
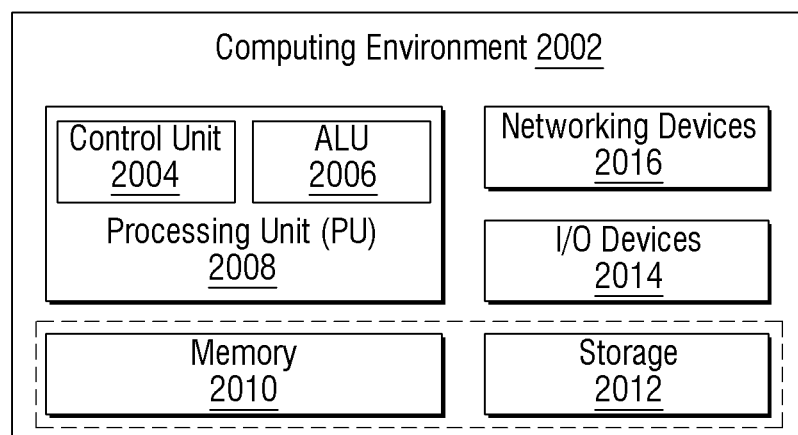
FIG. 20 illustrates a computing environment implementing the method and electronic device of managing a playback rate of a plurality of images, according to an exemplary embodiment.

FIG. 20 illustrates a computing environment 2000 implementing the method and electronic device 200 of managing the playback rate of the plurality of images, according to an exemplary embodiment. As depicted in the figure, the computing environment 2002 may include at least one processing unit 2008 that is equipped with a control unit 2004 and an arithmetic logic unit (ALU) 2006, a memory 2010, a storage unit 2012, one or more networking devices 2016, and one or more input/output (I/O) devices 2014. The processing unit 2008 is responsible for processing the instructions of the schemes. The processing unit 2008 receives commands from the control unit 2004 in order to perform its processing. Further, any logical and arithmetic operations involved in the execution of the instructions may be computed with the help of the ALU 2006.

The overall computing environment 2002 may include multiple homogeneous or heterogeneous cores, multiple central processing units (CPUs) of same or different kinds, and/or special media and other accelerators. The processing unit 2008 is responsible for processing the instructions of the schemes. Further, the plurality of processing units 2008 may be located on a single chip or over multiple chips.

The scheme comprising of instructions and code required for the implementation may be stored in either the memory unit 2010, or the storage 2012 or both. At the time of execution, the instructions may be fetched from the corresponding memory 2010 or storage unit 2012, and executed by the processing unit 2008.

In case of any hardware implementations various networking devices 2016 or external I/O devices 2014 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1B through 20 may include blocks or modules which can be implemented with hardware, software, or a combination of both hardware and software.

The methods explained above may be implemented in forms of program commands that may be performed through various computer means, and may then be recorded in computer-readable media. The computer-readable media may include a program command, a data file, a data structure, or a combination thereof. The program commands that may be recorded in the computer-readable media may be specially designed and configured for the present disclosure. Examples of the computer-readable record media include magnetic media such as hard disks, floppy disks, magnetic tape, optical media such as compact disc read-only memories (CD-ROMs) and digital versatile discs (DVDs), magneto-optical media such as floptical disks and hardware devices such as ROMs, RAMs and floppy memory specially configured to store and perform program commands. Examples of the program commands include not only machine code that is made by compilers but also high-level code that may be executed by computers using interpreters and the like. The hardware devices mentioned above may be configured to operate as one or more software in order to perform the operations of the present disclosure, and vice versa.

The foregoing example embodiments and features are merely examples and are not to be construed as limiting the disclosure. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A method for controlling a playback rate of a plurality of images using an electronic device, the method comprising:
    obtaining the plurality of images through a camera;
    obtaining motion data of at least one region of interest (ROI) in the plurality of images, wherein a position of the ROI in the plurality of images corresponds to a position of at least one object included in the ROI;
    identifying an image quality of the at least one ROI in the plurality of images based on at least one of a blur intensity or a contrast of the at least one ROI in the plurality of images;
    identifying a key moment image from among the plurality of images based on the obtained motion data and the identified image quality;
    determining at least one playback rate for the plurality of images based on the obtained motion data and a temporal distance of each of the plurality of images from the key moment image; and
    displaying the plurality of images based on the at least one playback rate.

2. The method as claimed in claim 1, wherein the determining comprises:
    assigning a score to each of the plurality of images based on the obtained motion data and a temporal distance of each of the plurality of images from the key moment image; and
    selecting at least one playback rate for the plurality of images based on the score.

3. The method as claimed in claim 2, wherein the plurality of images comprises a first set of images before capturing a reference image and a second set of images after capturing the reference image.

4. The method as claimed in claim 3, wherein the identifying comprises:
    in response to the reference image having a high image quality above a threshold image quality, selecting the reference image as the key moment image;
    in response to the reference image having a low image quality below the threshold image quality, selecting an alternative image as the key moment image based on the determined image quality.

5. The method as claimed in claim 1, wherein the determining comprises:
    detecting at least one of a plurality of non-planar regions and a plurality of salient features displayed in each of the plurality of images, to yield a detection result;
    identifying a key moment image from among the plurality of images based on the detection result;
    assigning a score to each of the plurality of images based on the obtained motion data and a temporal distance of each of the plurality of images from the key moment image; and
    selecting the at least one playback rate for the plurality of images based on the score.

6. The method as claimed in claim 1, wherein the determining comprises:
    displaying a bounding box for the at least one ROI in at least one of the plurality of images based on the obtained motion data;
    tracking the bounding box and determining whether an area of the bounding box for the at least one ROI in the at least one of the plurality of images exceeds a predetermined threshold; and
    in response to the area of the bounding box in the at least one of the plurality of images exceeding the predetermined threshold, selecting a first playback rate for the at least one of the plurality of images, and selecting a second playback rate for the other image of the plurality of images,
    wherein the second playback rate is faster than the first playback rate.

7. The method as claimed in claim 1, wherein the motion data is detected based on at least one of a camera cue, an image analysis, a viewing window, a motion of the electronic device, and a visual activity in at least one image of the plurality of images.

8. The method as claimed in claim 1, further comprising:
    discarding at least one image from among the plurality of images based on at least one of a motion parameter, a camera cue, a visual activity, and an image quality.

9. The method as claimed in claim 1, further comprising:
    detecting a tilt motion of the electronic device;
    in response to the electronic device being tilted to a first direction, displaying a preset number of subsequent images with a first playback rate; and
    in response to the electronic device being tilted to a second direction different from the first direction, displaying the preset number of subsequent images with a second playback rate faster than the first playback rate.

10. The method as claimed in claim 1, further comprising: providing a visual indicator to a user of the electronic device in response to the at least one playback rate being varied.

11. An electronic device of controlling a playback rate of a plurality of images, the electronic device comprising:
a display;
a camera; and
a processor configured to:
   obtain the plurality of images through the camera,
   obtain motion data of at least one region of interest (ROI) in the plurality of images, wherein a position of the ROI in the plurality of images corresponds to a position of at least one object included in the ROI,
   identify an image quality of the at least one ROI in the plurality of images based on at least one of a blur intensity or a contrast of the at least one ROI in the plurality of images,
   identify a key moment image from among the plurality of images based on the obtained motion data and the identified image quality,
   determine at least one playback rate for the plurality of images based on the obtained motion data and a temporal distance of each of the plurality of images from the key moment image, and
   control the display to display the plurality of images based on the at least one playback rate.

12. The electronic device as claimed in claim 11, wherein the processor is further configured to:
   assign a score to each of the plurality of images based on the obtained motion data and a temporal distance of each of the plurality of images from the key moment image, and
   select the at least one playback rate for the plurality of images based on the score.

13. The electronic device as claimed in claim 12, wherein the plurality of images comprises a first set of images before capturing a reference image and a second set of images after capturing the reference image.

14. The electronic device as claimed in claim 13, wherein the processor is further configured to
   select the reference image as the key moment image in response to the reference image having a high image quality above a threshold image quality, and
   select an alternative image as the key moment image based on the determined image quality in response to the reference image having a low image quality below the threshold image quality.

15. The electronic device as claimed in claim 11, wherein the processor is further configured to:
   detect at least one of a plurality of non-planar regions and a plurality of salient features displayed in each of the plurality of images, to yield a detection result,
   identify a key moment image from among the plurality of images based on the detection result,
   assign a score to each of the plurality of images based on the obtained motion data and a temporal distance of each of the plurality of images from the key moment image, and
   select the at least one playback rate for the plurality of images based on the score.

16. The electronic device as claimed in claim 11, wherein the processor is further configured to:
   control the display to display a bounding box for the at least one ROI in at least one of the plurality of images based on the obtained motion data,
   track the bounding box, determines whether an area of the bounding box for the at least one ROI in the at least one of the plurality of images exceeds a predetermined threshold, and
   in response to the area of the bounding box in the at least one of the plurality of images exceeding the predetermined threshold, select a first playback rate for the at least one of the plurality of images in response to the area of the bounding box in the at least one of the plurality of images exceeding the predetermined threshold, and select a second playback rate for the other of the plurality of images,
   wherein the second playback rate is faster than the first playback rate.

17. The electronic device as claimed in claim 11, the motion data is detected based on at least one of a camera cue, an image analysis, a viewing window, a motion of the electronic device, and a visual activity in at least one image of the plurality of images.

18. The electronic device as claimed in claim 11, wherein the processor is further configured to discard at least one image from among the plurality of images based on at least one of a motion parameter, a camera cue, a visual activity, and an image quality.

19. The electronic device as claimed in claim 11, further comprising:
   a sensor configured to sense a tilting motion of the electronic device,
   wherein the processor is further configured to control the display to display a preset number of subsequent images with a first playback rate in response to the electronic device being tilted to a first direction, and control the display to display the preset number of subsequent images with a second playback rate faster than the first playback rate in response to the electronic device being tilted to a second direction different from the first direction.

20. The electronic device as claimed in claim 11, the processor is further configured to control the display to provide a visual indicator to a user of the electronic device in response to the at least one playback rate being varied.

* * * * *